US012531383B2

(12) United States Patent
Gore et al.

(10) Patent No.: US 12,531,383 B2
(45) Date of Patent: Jan. 20, 2026

(54) METHOD AND APPARATUS FOR TESTING A DIE PACKAGE ASSEMBLY

(71) Applicant: SAMTEC, INC., New Albany, IN (US)

(72) Inventors: Brandon Thomas Gore, New Albany, IN (US); Richard Mellitz, New Albany, IN (US); Gauss Yang, New Albany, IN (US); Kelly Garrison, New Albany, IN (US); Norman S. Mcmorrow, Brunswick, ME (US)

(73) Assignee: SAMTEC, INC., New Albany, IN (US)

( * ) Notice: Subject to any disclaimer, the term of this patent is extended or adjusted under 35 U.S.C. 154(b) by 475 days.

(21) Appl. No.: 17/760,138

(22) PCT Filed: Feb. 4, 2021

(86) PCT No.: PCT/US2021/016531
§ 371 (c)(1),
(2) Date: Aug. 4, 2022

(87) PCT Pub. No.: WO2021/158734
PCT Pub. Date: Aug. 12, 2021

(65) Prior Publication Data
US 2023/0335960 A1   Oct. 19, 2023

Related U.S. Application Data

(60) Provisional application No. 62/969,724, filed on Feb. 4, 2020.

(51) Int. Cl.
*G01R 31/28* (2006.01)
*H01R 12/72* (2011.01)
(Continued)

(52) U.S. Cl.
CPC ....... *H01R 25/003* (2013.01); *G01R 31/2896* (2013.01); *H01R 12/722* (2013.01); *H01R 12/75* (2013.01); *H01R 2201/20* (2013.01)

(58) Field of Classification Search
CPC .. G01R 31/2896; H01R 12/722; H01R 12/75; H01R 2201/20; H01R 25/003
See application file for complete search history.

(56) References Cited

U.S. PATENT DOCUMENTS 4,867,707 A   9/1989   Widdoes
6,273,753 B1   8/2001   Ko
(Continued)

FOREIGN PATENT DOCUMENTS

KR   10-2015-0012209 A   2/2015
TW   201910538 A   3/2019
(Continued)

OTHER PUBLICATIONS

Ardent Concepts, "Amphenol Ardent Concepts Releases New Low-Profile Right Angle 16-Channel Multicoax Connector", Jan. 28, 2020, 2, https://www.ardentconcepts.com/amphonol-ardent-concepts-releases-new-low-profile-right-angle-16-channel-multicoax-connector/.

*Primary Examiner* — Vinh P Nguyen
(74) *Attorney, Agent, or Firm* — BakerHostetler

(57) ABSTRACT

A twinaxial cable splitter is in electrical communication with an IC die package. First and second coaxial electrical cables are configured to route electrical signals to a testing device that is configured to determine certain metrics of an IC chip of the die package. Thus, a method is provided for testing an IC die package assembly by placing an IC package testing device in electrical communication with a first electrical connector mounted to a package substrate of the die package assembly that includes the package substate and an IC die mounted on the package substrate, and determining at least one performance metric of the die package assembly.

10 Claims, 20 Drawing Sheets

(51) Int. Cl.
*H01R 12/75* (2011.01)
*H01R 25/00* (2006.01)

(56) References Cited

U.S. PATENT DOCUMENTS

| | | | |
|---|---|---|---|
| 6,929,482 | B2 | 8/2005 | Benham |
| 10,074,920 | B2 | 9/2018 | Tran et al. |
| 10,393,799 | B2 * | 8/2019 | Kim .................. H01L 23/49822 |
| 10,833,437 | B2 | 11/2020 | Huang et al. |
| 11,588,262 | B2 * | 2/2023 | Mongold ............ H01R 13/6587 |
| 11,637,404 | B2 * | 4/2023 | Mongold ............ H01R 12/594 |
| | | | 439/607.06 |
| 11,693,025 | B2 * | 7/2023 | Chen .................. H01R 12/7076 |
| | | | 324/756.02 |
| 11,916,325 | B1 * | 2/2024 | Balasubramanian .. H01R 12/75 |
| 2004/0152359 | A1 | 8/2004 | Benham |
| 2005/0212546 | A1 * | 9/2005 | Lynch ................. G01R 31/2896 |
| | | | 324/762.03 |
| 2015/0028908 | A1 | 1/2015 | Kushnick et al. |
| 2015/0302952 | A1 | 10/2015 | Chiu et al. |
| 2016/0218455 | A1 * | 7/2016 | Sayre ................. H01R 13/6594 |
| 2017/0068055 | A1 | 3/2017 | Masuda et al. |
| 2019/0051587 | A1 * | 2/2019 | Azeroual ............ H01L 21/4857 |
| 2019/0267732 | A1 | 8/2019 | Buck et al. |

FOREIGN PATENT DOCUMENTS

| | | |
|---|---|---|
| WO | 2018/045026 A1 | 3/2018 |
| WO | 2019/028322 A1 | 2/2019 |
| WO | 2019/099450 A1 | 5/2019 |
| WO | 2020/051183 A2 | 3/2020 |
| WO | 2020/076785 A1 | 4/2020 |

* cited by examiner

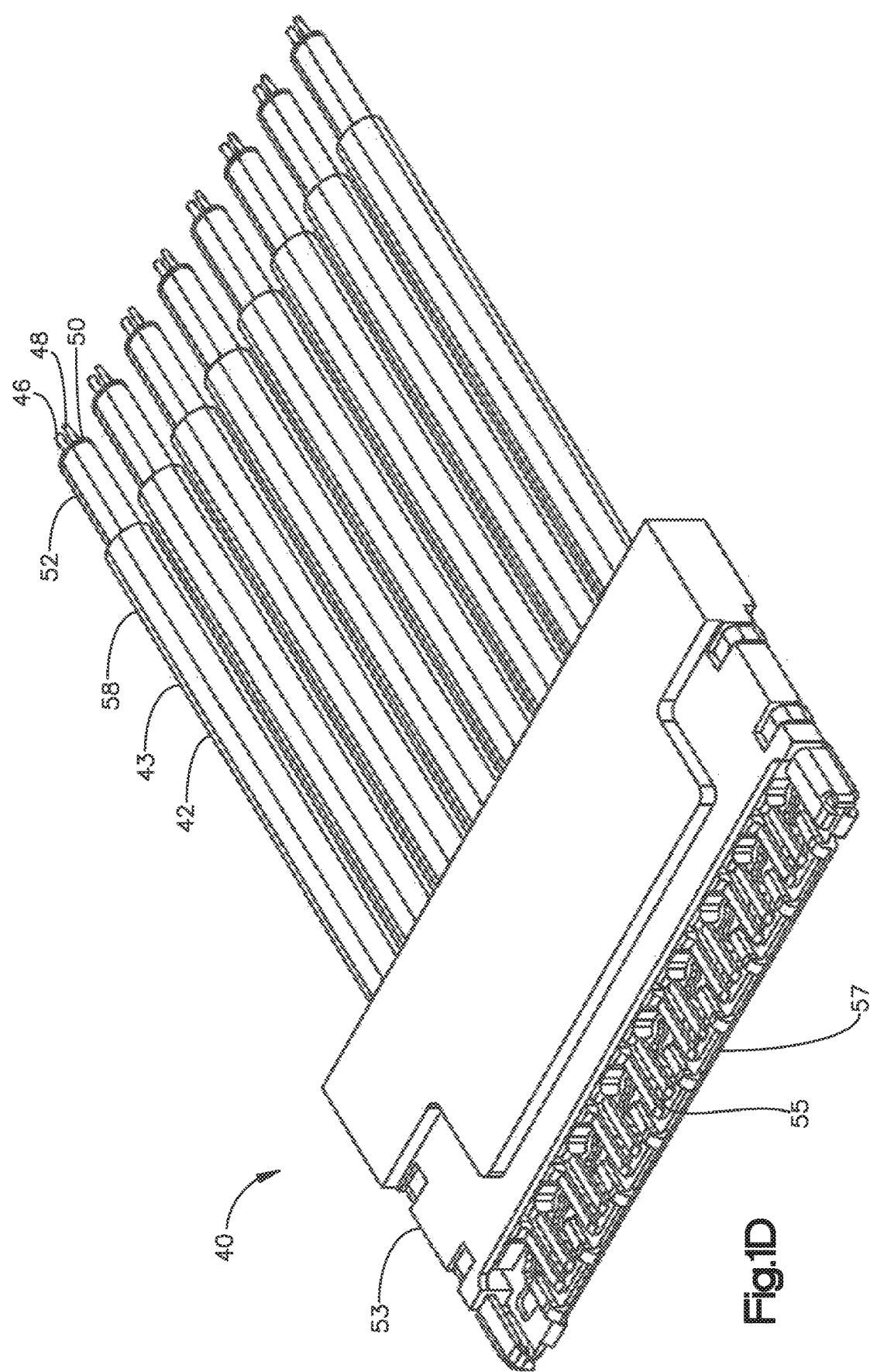

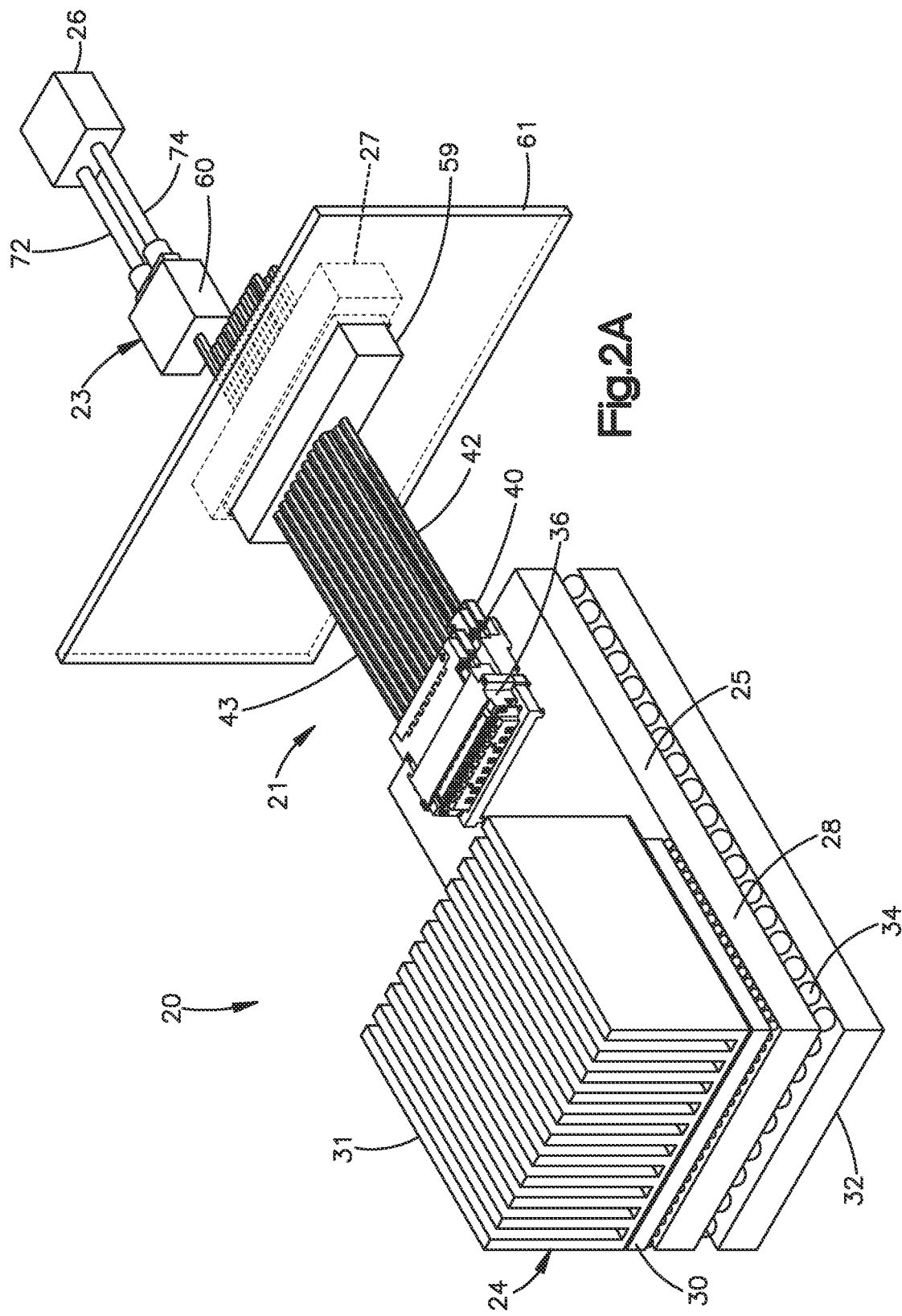

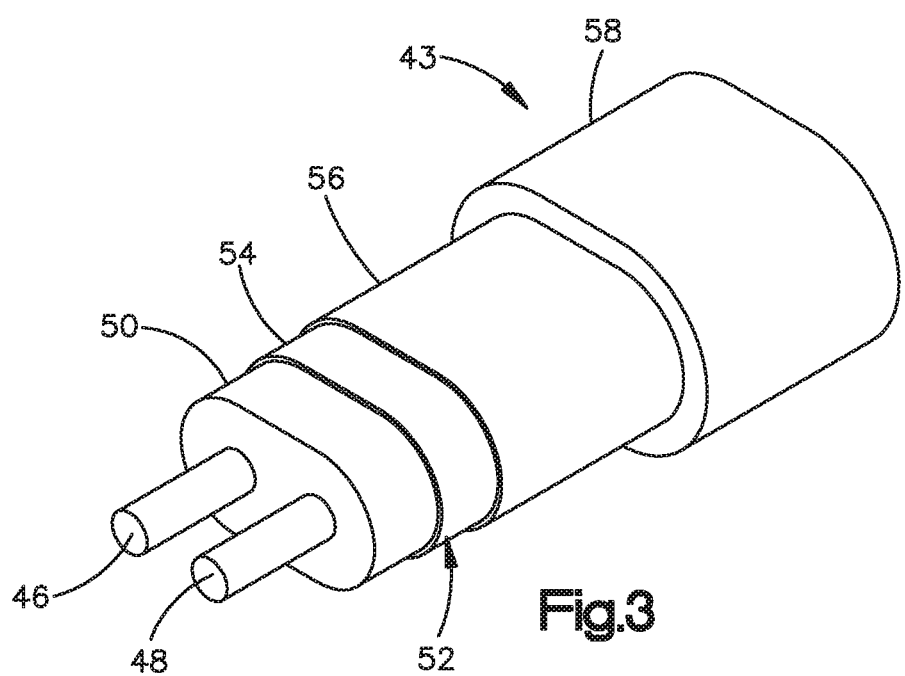

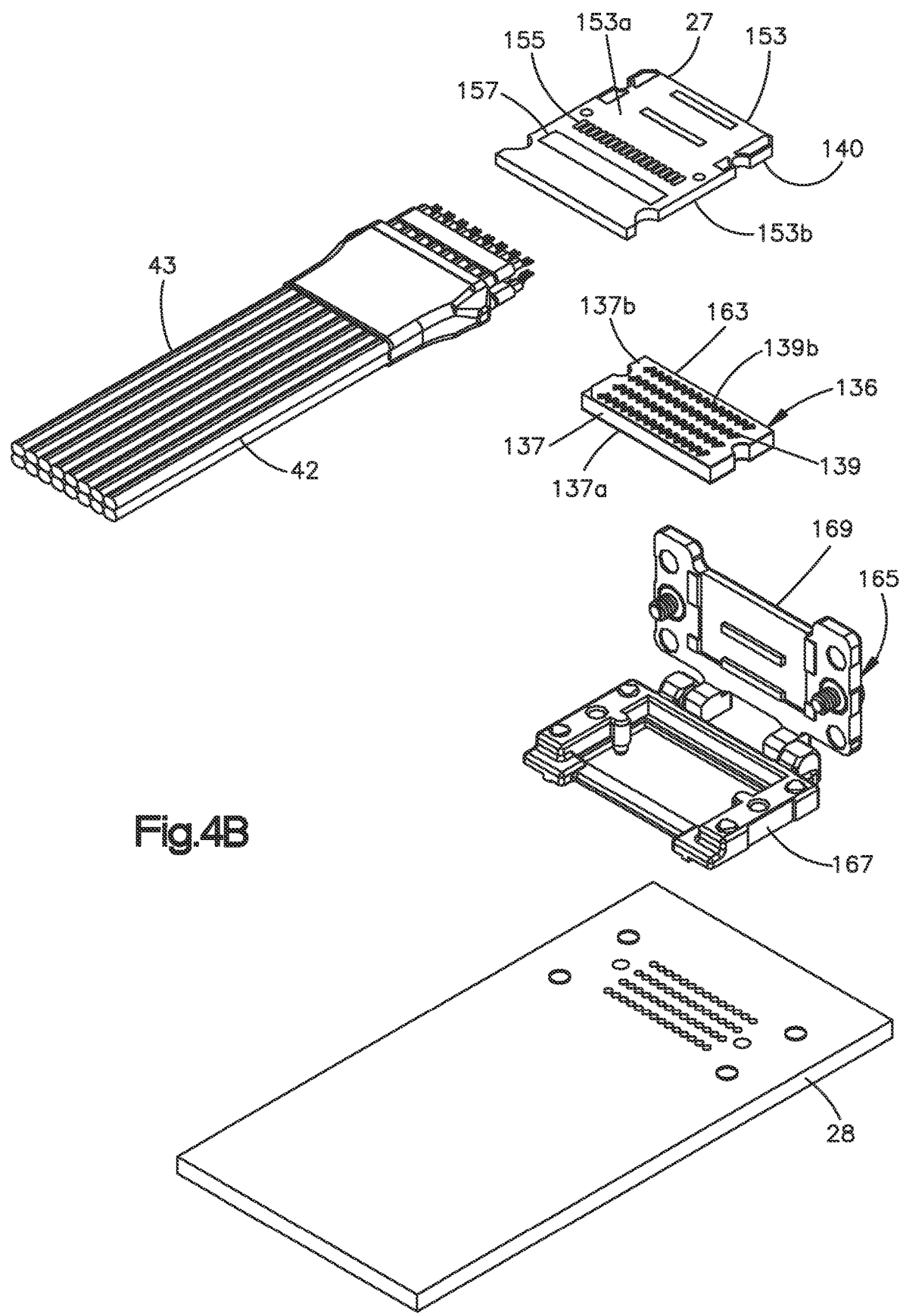

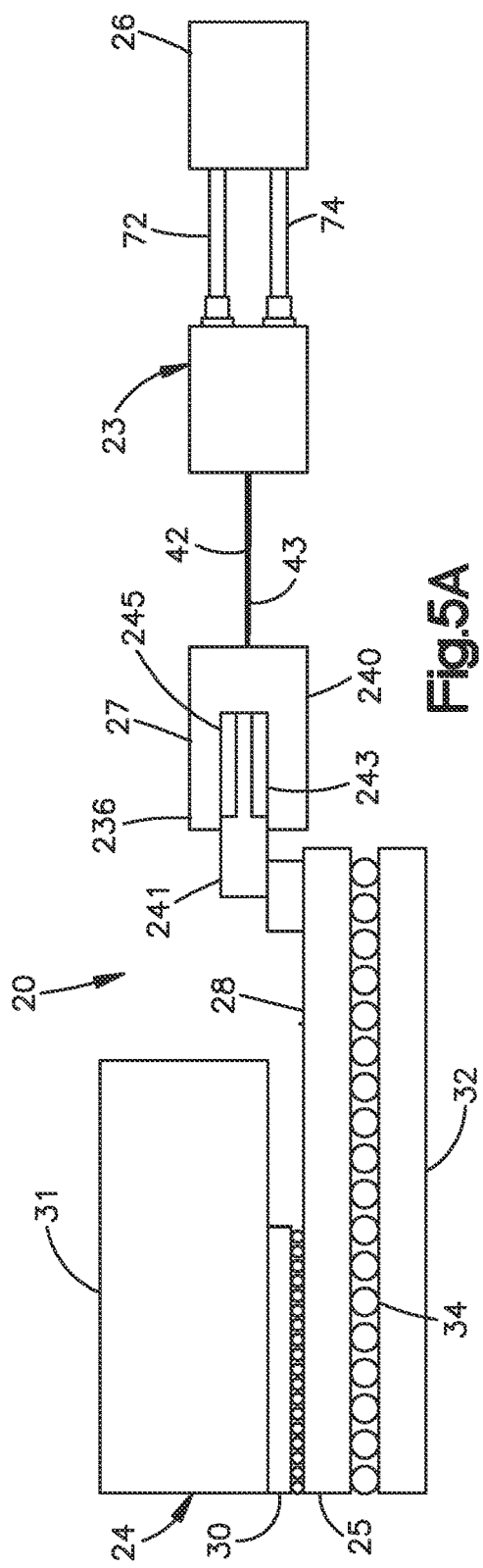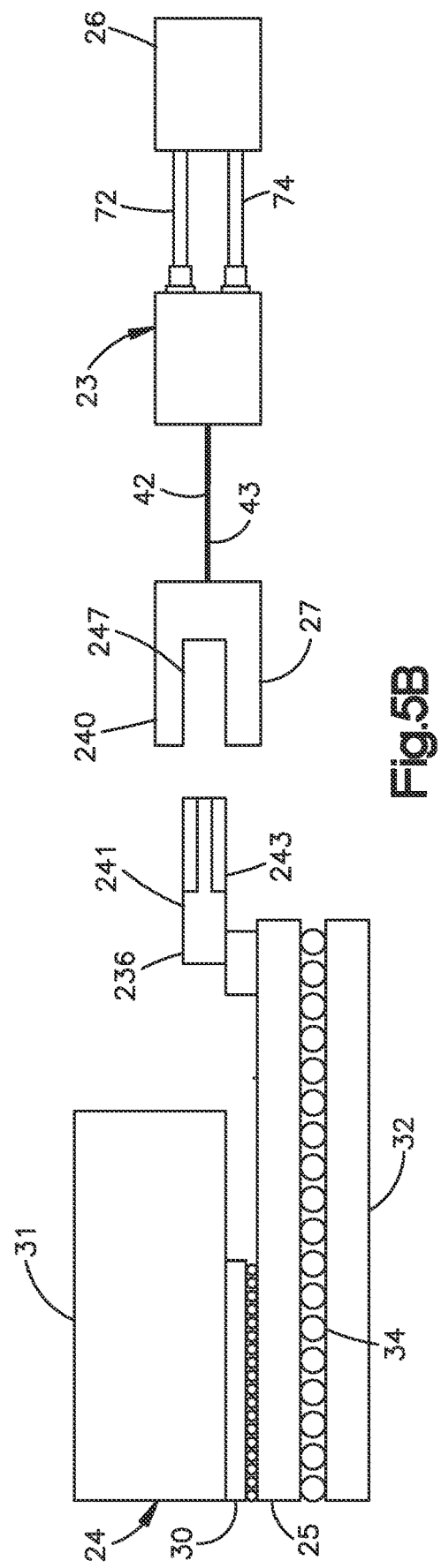

METHOD AND APPARATUS FOR TESTING A DIE PACKAGE ASSEMBLY

CROSS-REFERENCE TO RELATED APPLICATIONS

The present U.S. Patent Application is a U.S. National Phase Application under 35 U.S.C. § 371 of International Application No. PCT/US2021/016531 filed on Feb. 4, 2021, which claims priority to U.S. Patent Application Ser. No. 62/969,724 filed Feb. 4, 2020, the disclosures of which are hereby incorporated by reference as if set forth in their entireties herein.

BACKGROUND

Conventional testing systems exist for the determination of various performance metrics of an integrated circuit (IC) package that includes a package printed circuit board (PCB) and an integrated circuit that can be in the form of an IC chip mounted to the package PCB. The integrated circuit is conventionally configured as an application specific integrated circuit (ASIC). The package PCB, in turn, is mounted to a host PCB, for instance via a ball grid array. A testing device is placed in electrical communication with the package PCB, and thus also in electrical communication with the IC chip.

While such testing systems are suitable for their intended purpose, conventional testing systems are not configured to test the IC package when the IC package includes electrical cable connectors that include twinaxial cables and are mounted to the package PCB. In particular, conventional testing systems are generally not configured to receive twinaxial cables so as to test the performance metrics of the IC package including the IC die.

SUMMARY

In one example, a twinaxial cable splitter includes a housing, electrically nonconductive substrate supported by the housing, and first and second electrical conductors supported by the electrically nonconductive substrate and electrically isolated from each other. The first electrical conductor can define a respective first portion that is configured to be placed in electrical contact with a first electrical signal conductor of a twinaxial cable and a respective second portion that is in electrical communication with a first complementary electrical signal conductor of at least one complementary electrical component. The second electrical conductor can define a respective first portion that is configured to be placed in electrical contact with a second electrical signal conductor of the twinaxial cable and a respective second portion that is in electrical communication with a second complementary electrical signal conductor of the at least one complementary electrical component.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 1D is a perspective view of a second electrical connector of the die package testing apparatus of in FIG. 1A;

FIG. 2A is a perspective view of a die package testing system including a die package assembly and a die package testing apparatus in accordance another embodiment, the die package assembly including a die package, a first electrical connector mounted to the die package, and a second electrical connector mated with the first electrical connector;

FIG. 3 is a perspective view of a twinaxial cable of a plurality of twinaxial cables that can be included in on or both of a die package assembly and a die testing apparatus;

FIG. 4B is an exploded perspective view of first and second electrical connectors of the die package testing system illustrated in FIG. 4A;

FIG. 5A is a side elevation view of a die package testing system including a die testing apparatus for a die package assembly constructed in accordance with still another alternative embodiment, wherein the die package assembly includes a die package, and a first edge-card connector mounted to the die package in another embodiment;

FIG. 5B is a side elevation view of the die package testing system of FIG. 4A, showing the die testing apparatus unmated from the die package assembly;

DETAILED DESCRIPTION

The present disclosure is directed to a die package testing apparatus that is configured to test a die package assembly having at least one electrical connector mounted to a die package. The at least one electrical connector can be a PCB-mounted electrical connector that is either mated to a cable connector or configured to be mated to a cable connector. Thus, the die package testing apparatus can include a cable connector that is be mated to the PCB-mounted electrical connector, or can be placed in electrical communication with electrical cables that extend out from the cable connector of the die package assembly. In one example, the electrical cables of the die package assembly and/or the die package testing apparatus are twin-axial cables. Thus, in one implementation, the die package testing apparatus includes a cable connector that is configured to place first and second electrical conductors of the twinaxial cable in electrical communication with respective first and second complementary electrical signal conductors of at least one complementary electrical component. The at least one complementary electrical component can include first and second complementary electrical components, such as a first coaxial cable and a second coaxial cable. The coaxial cables can be configured as radiofrequency (RF) cables.

As used herein, the terms "substantially," "approximately," "about," and derivatives thereof and words of similar import as used herein recognizes that the referenced dimensions, sizes, shapes, directions, or other parameters can include the stated dimensions, sizes, shapes, directions, or other parameters and up to ±20%, including ±10%, ±5%, and ±2% of the stated dimensions, sizes, shapes, directions, or other parameters. Further, the term "at least one" stated structure as used herein can refer to either or both of a single one of the stated structure and a plurality of the stated structure. Additionally, reference herein to a singular "a," "an," or "the" applies with equal force and effect to a plurality unless otherwise indicated. Similarly, reference to a plurality herein applies with equal force and effect to the singular "a," "an," or "the."

References herein to "one embodiment", "an embodiment", "an example", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
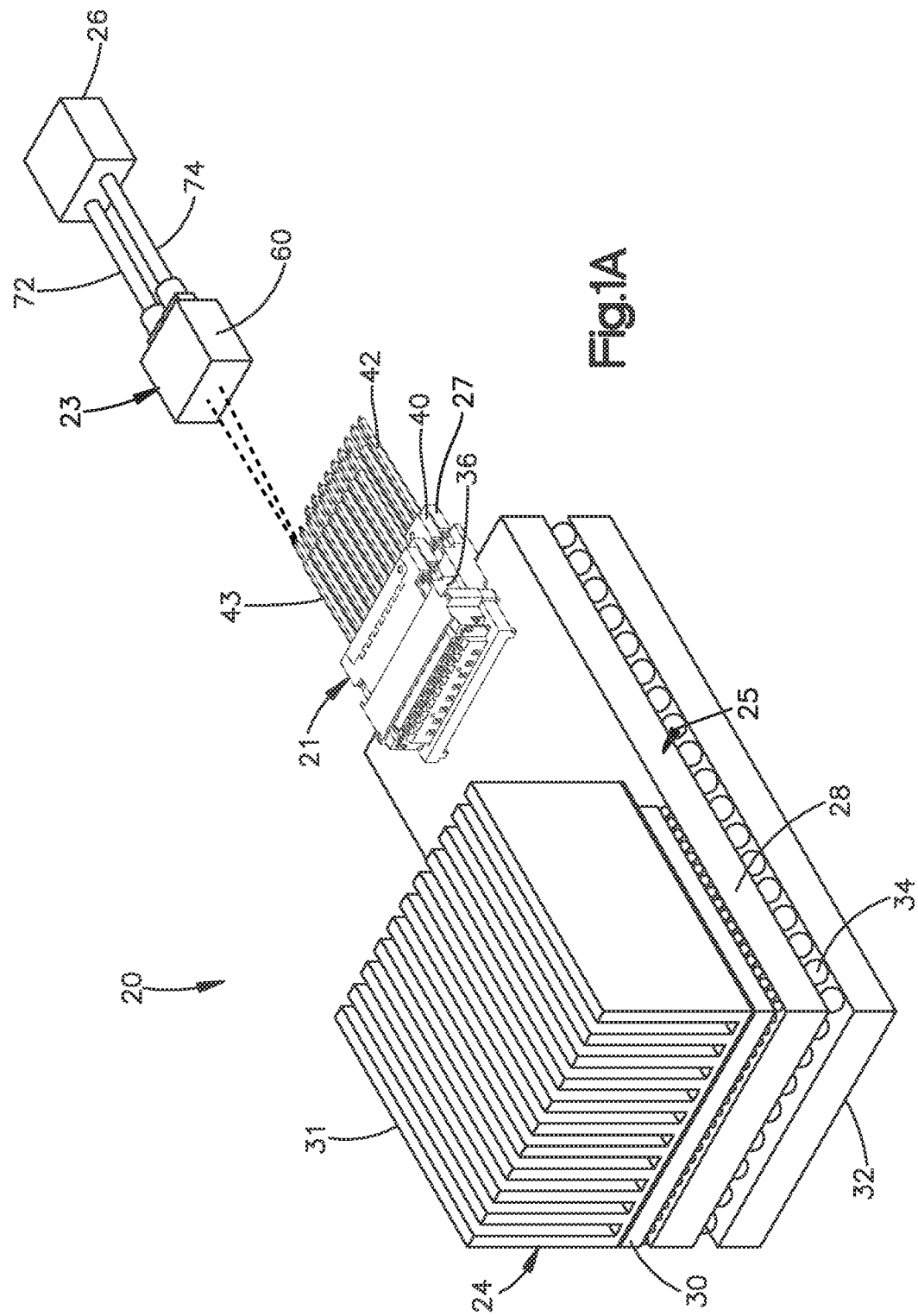
FIG. 1A is a perspective view of a die package testing system including a die package assembly and a die package testing apparatus in accordance with one embodiment, the die package assembly including a die package and an electrical connector mounted to the die package.
Figure 1B:
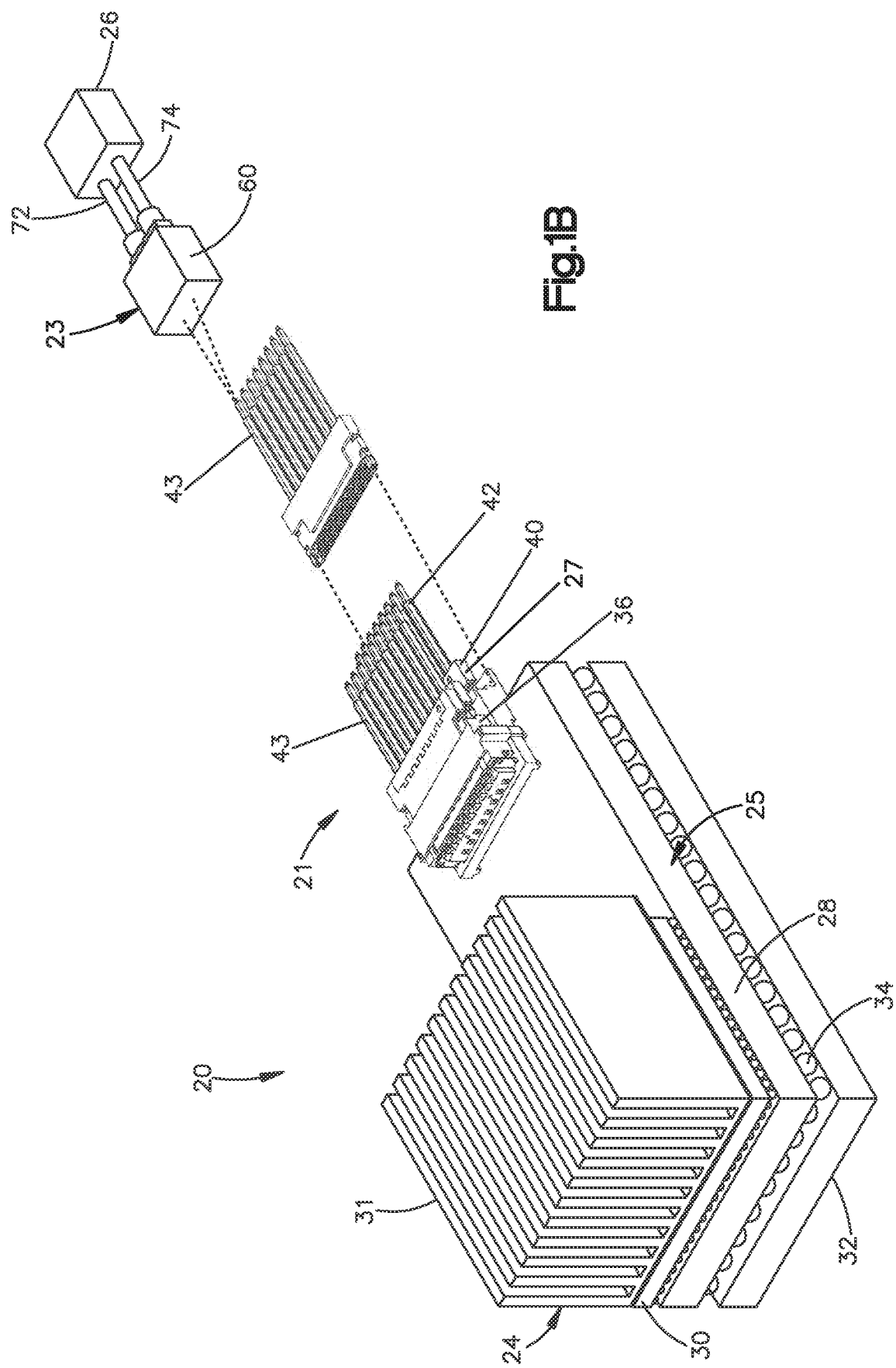
FIG. 1B is a perspective view of the die package testing system of FIG. 1A, showing the die package testing apparatus unmated from the die package assembly.

Referring now to FIGS. 1A-1B, a die package testing system 20 includes a die package assembly 24 and a die package testing apparatus 23 that is configured to be placed in electrical communication with the die package assembly 24. The die package assembly 24 includes an IC die package 25 and at least one electrical connector. The die package 25 includes a die package substrate 28 and an integrated circuit (IC) 30 mounted to the package substrate 28. The IC 30 can be in the form of an IC die. The die package 25 can further include a heat sink 31 in thermal communication with the IC 30 and configured to remove heat from the IC 30 during operation. The package substrate 28 can be configured as a printed circuit board (PCB) in some examples. The integrated circuit 30 can be configured as an IC chip. In some examples, the integrated circuit 30 can be an application specific integrated circuit (ASIC) configured as an ASIC chip. The die package 25, and in particular the package substrate 28, can be mounted to a host substrate 32 at any suitable mounting interface 34. The host substrate 32 can be configured as a host PCB. The package substrate 28 can be mounted to the host substrate 32 in any suitable manner. Any suitable electrical power source can supply electrical power to the integrated circuit 30.

The die package testing system 20 includes first and second electrical connectors 36 and 40 that are configured to mate with each other. The first electrical connector 36 is configured to be mounted onto the package substrate 28. The second electrical connector 40 can be mounted to a plurality of electrical cables. In one example, the package assembly 24 can include at least one electrical connector, such as at least one of the first and second electrical connectors 36 and 40. In one example, the at least one electrical connector can include at least one first electrical connector 36 mounted to the die package 25, and in particular to the package substrate 28. Thus, the first electrical connector 36 can be referred to as a PCB-mounted electrical connector 36 (or board connector) that is mounted to the package substrate 28. Though not shown, the die package assembly 24 can include a plurality of first electrical connectors 36 mounted to the package substrate 28 and arranged about the IC 30, such as about the outer perimeter of the package substrate 28 can include a plurality of testers each in communication with a respective one of the first electrical connectors and/or second electrical connectors. In other examples, the die package assembly 24 can include the at least one first electrical connector 36 and at least one second electrical connector 40 that is configured to mate with the first electrical connector 36. The second electrical connector 40 can be mounted to a plurality of electrical cables 42 so as to define a cable connector. In this regard, the first electrical connector and the cable connector can be said to define a cable connector system 21. In one example, the electrical cables 42 are twinaxial cables 43. When the first and second electrical connectors 36 and 40 are mated with each other while the first electrical connector 36 is mounted to the package substrate 28, the electrical cables are placed in electrical communication with the IC 30 via electrical traces carried by the package substrate 28.

The die package testing apparatus 23 can include at least one die package testing device 26 that is configured to be placed in electrical communication with the at least one electrical connector of the die package assembly 24, and thus with the IC 30, so as to determine at least one performance metric of the die package assembly 24, and in particular of the integrated circuit 30. It should further be appreciated in some examples that the die package testing device 26 can communicate with the IC die over both a twinaxial cable and a pair of coaxial cables that are in electrical communication with the twin axial cable, but the die package testing device does not communicate with the IC die over a cable communication path that does not include at least one twinaxial cable. In particular, the first and second electrical connectors 36 and 40, or alternatively constructed cable connector system 21, can be in electrical communication with both the IC 30 and the die package testing device 26. The die package testing device 26 can determine one or more metrics of the die package assembly, and in particular of the IC 30, such as the silicon performance of the IC 30, including but not limited to baud rate, output differential voltage, output alternating current (AC) common mode voltage, single-ended transmitter output voltage, effective return loss, common mode output return loss, level separation mismatch ratio, steady-state voltage, linear fit pulse peak, signal-to-noise-and-distortion ratio, uncorrelated jitter, uncorrelated jitter RMS, and even-odd jitter. These characteristics are described in more detail in IEEE 802.03 active as of the filing date of the present patent application, wherein IEEE 802.03 is hereby incorporated by reference as if set forth in its entirety herein. As the die package testing apparatus 23, and in particular the die package testing device 26, is in electrical communication with both the die package 25 and the first electrical connector 36 mounted to the die package 25, the testing of the die package 25 can include the first electrical connector 36, which can impact the performance metrics determined by the testing device 26.

As illustrated in FIGS. 1A-1B, the die package testing apparatus 23 can include a die package testing device 26, a testing apparatus connector 27 that is mounted to twinaxial cables 43, a twinaxial cable splitter 60 that is configured to be placed in electrical communication with at least one of the twinaxial cables 43 as described in more detail below, and route electrical signals from the twinaxial cables 43 to a respective at least one pair of coaxial cables 72 and 74, which then route respective radio frequency (RF) signals to the testing device 26. In this regard, the die package testing device 26 is placed in electrical communication with the die package assembly 24 via the coaxial cables 72 and 74, the twinaxial cable splitter 60, and the cable connector 40 that is mated to the first electrical connector 36. In particular, the coaxial cables 72 and 74 can be coupled to each of the twinaxial cable splitter 60 and the die package testing device 26. In one example, the testing apparatus connector 27 can be defined by the second electrical connector 40. Accordingly, a separable interface can be defined between the first and second electrical connectors 36 and 40, which thereby establishes a separable interface between the die package assembly 24 and the die package testing apparatus 23. Accordingly, the second electrical connector 40 of the die package testing apparatus 23 can be mated with the first electrical connector 36 of the die package assembly 24 so as to place the die package testing device 26 in electrical communication with the IC 30.

Once testing of the die package 25 has been completed and the determined performance metrics were within acceptable ranges, the die package testing apparatus 23 can be disconnected from the die package assembly 24 as shown in FIG. 1B. In one example, the die package testing apparatus is disconnected from the die package assembly 24 by unmating the second electrical connector 40 of the die package testing apparatus 23 from the first electrical connector 36 of the die package assembly 24. Thus, the die package assembly 24, and in particular the first electrical connector 36, can be placed in electrical communication with a complementary electrical component for use. In other examples described below with reference to FIGS. 2A-2B, the die package assembly 24 can further include the second electrical connector 40 and the electrical cables 42 that are designed to be mated with the first electrical connector 36 during use of the die package assembly 24 after the step of determining at least one performance metric of the die package assembly 24, and in particular of the IC die. Thus, the die testing apparatus 23 can be disconnected from the die package assembly 24 by disconnecting the die package testing apparatus 23 from the twinaxial cables 43.

Figure 1C:
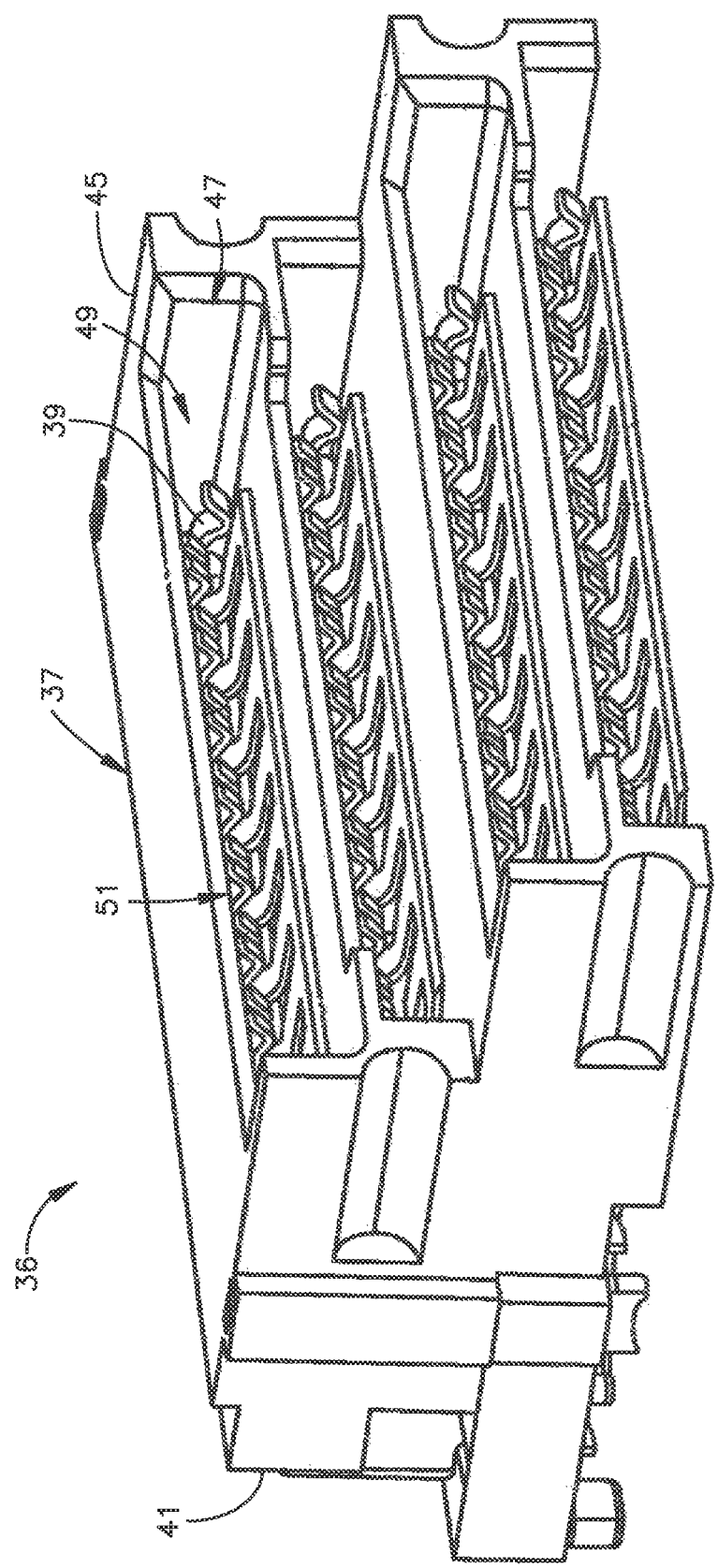
FIG. 1C is a perspective view of a first electrical connector of the die package assembly illustrated in FIG. 1A.

Referring now to FIGS. 1C-1D, the first electrical connector 36 includes a first connector housing 37 and a plurality of first electrical contacts 39 supported by the first connector housing 37. The first connector housing 37 can be electrically insulative. In one example, the electrical contacts 39 can be overmolded by the first connector housing 37, or otherwise supported as desired. For instance, the electrical contacts can be overmolded by electrically insulative leadframe housings to define a leadframe assembly that is then supported by the connector housing. The first electrical contacts 39 can include electrical signal contacts and electrical ground contacts arranged in any suitable manner as desired. Immediately adjacent ones of electrical signal contacts can define differential signal pairs. Alternatively, the first electrical contacts 39 can be single ended as desired. The first electrical connector 36 is configured to be mounted to the package substrate 28, such that the first electrical contacts 39 are in electrical communication with the die package 25, and in particular with the IC 30. In particular, the first electrical contacts 39 can be mounted to respective electrical contact pads of the package substrate 28. In other examples, the first electrical connector 36 can be mounted to the host substrate 32, such that the first electrical contacts 39 are placed in electrical communication with the IC 30.

In one example, the first connector housing 37 can include a first housing portion 41 and a second housing portion 45 that can be secured to each other in any suitable manner, or can be monolithic with each other. The first housing portion 41 can be configured to be mounted to an underlying substrate, which can be configured as the package substrate 28 or the host substrate 32 as noted above. The second housing portion 45 can define a mating interface 47 of the first electrical connector 36 that is configured to mate with at least one the second electrical connector 40. In particular, the second housing portion 45, and thus the first connector housing 37, can define a plurality of slots 49 that are configured to receive a respective plurality of second electrical connectors 40 so as to mate the first electrical connector 36 to the second electrical connectors 40. The slots 49 can be disposed adjacent each other along a transverse direction. The first electrical contacts 39 define mating portions that can extend into the slots 49. The mating portions of the first electrical contacts 39 in the respective slots 49 can be arranged along respective rows that are oriented along a lateral direction that is perpendicular to the transverse direction. The slots 49 define openings 51 that receive the respective ones of the second electrical connectors 40. The slots 49 are configured to receive respective ones of the second electrical connector 40 in a mating direction. The mating direction can be oriented perpendicular to the lateral direction and the transverse direction. The opening 51 of at least a first one of the slots 49 can be offset from the opening 51 of at least a second one of the slots 49 in the mating direction, whereby the first one of the slots 49 is spaced further from the underlying substate a greater distance than a distance at which the second one of the slots 49 is spaced from the underlying substrate. The distances can be measured along the transverse direction.

Each second electrical connector 40 can be mounted to a plurality of electrical cables 42. In this regard, the second electrical connector 40 can be referred to as a cable connector. The electrical cables 42 can be configured as twinaxial cables 43 in one example. The second electrical connector 40 can include an electrically insulative second connector housing 53 and a plurality of second electrical contacts 55 supported by the second connector housing 53. In particular, the second electrical contacts 55 of each of the second electrical connectors 40 can be arranged in respective rows that are oriented along the lateral direction A. The second electrical contacts 55 can include electrical signal contacts and electrical ground contacts arranged in any suitable manner as desired. Immediately adjacent ones of electrical signal contacts can define differential signal pairs. Alternatively, the second electrical contacts 55 can be single ended as desired. A mating region of the second connector housing 53 can be sized to be received in a respective one of the slots 49, such that respective mating portions of the second electrical contacts 55 mate with the respective mating portions of the first electrical contacts 39. The first electrical contacts 39 and the second electrical contacts 55 can mate with each other such that signal contacts of the first plurality of electrical contacts 39 mate with respective signal contacts of the second electrical contacts 55, and ground contacts of the first plurality of electrical contacts 39 mate with respective ground contacts of the second electrical contacts 55.

The second electrical connector 40 can further include a plurality of electrical cables 42 mounted to respective mounting portions of the second electrical contacts. In one example, the second electrical connector 40 can include an electrically conductive shield 57 that defines the ground contacts, such that the ground contacts are electrically and physically commoned together. Alternatively, the ground contacts of the second electrical contacts 55 can be configured as discrete electrical contacts.

Referring now to FIG. 2A, and as described above, in some examples the at least one electrical connector of the die package assembly 24 can include the first electrical connector 36 and the cable connector defined by the second electrical connector 40 and the electrical cables 42 having a first end mounted to the second electrical connector 40. The electrical cables 42 can have a second end opposite the first end that is mounted to a third electrical connector 59. Thus, the at least one electrical connector of the die package assembly 24 can also include the third electrical connector 59. The die package testing apparatus 23 can include the testing device 26, the at least one pair of coaxial cables 72 and 74, the twinaxial splitter 60, and the testing apparatus connector 27, and twinaxial cables 43 mounted to each of the testing apparatus connector 27 and the splitter 60. The testing apparatus connector 27 can be configured to mate with the third electrical connector 59, thereby placing the testing device 26 in electrical communication with the die package assembly 24 as described above. In this regard, the die package testing device 26 is placed in electrical communication with the die package assembly 24 via the coaxial cables 72 and 74, the twinaxial cable splitter 60, and the testing apparatus connector 27. Because the testing apparatus connector 27 is mounted to the twinaxial cables 43 that, in turn, are mounted to the splitter 60, the testing apparatus connector 27 can be referred to as a cable connector.

A separable interface can be defined between the third electrical connector 59 and the testing apparatus connector 27, which thereby establishes a separable interface between the die package assembly 24 and the die package testing apparatus 23. Accordingly, the testing apparatus connector 27 of the die package testing apparatus 23 can be mated with the third electrical connector 59 of the die package assembly 24 so as to place the die package testing device 26 in electrical communication with the IC 30. In one example, the testing apparatus connector 27 can be mounted to a first side of a panel 61, and the third electrical connector 59 can be inserted through an opening of the panel 61 from a second side of the panel opposite the first side, and mated with the testing apparatus connector 27.

As the die package testing apparatus 23, and in particular the die package testing device 26 is in electrical communication with the die package 25 via the first and second electrical connectors 36 and 40 and the third electrical connector 59, the performance of the die package assembly 24 and the electrical connectors 36, 40, and 59 can impact the performance metrics determined by the testing device 26.

Figure 2B:
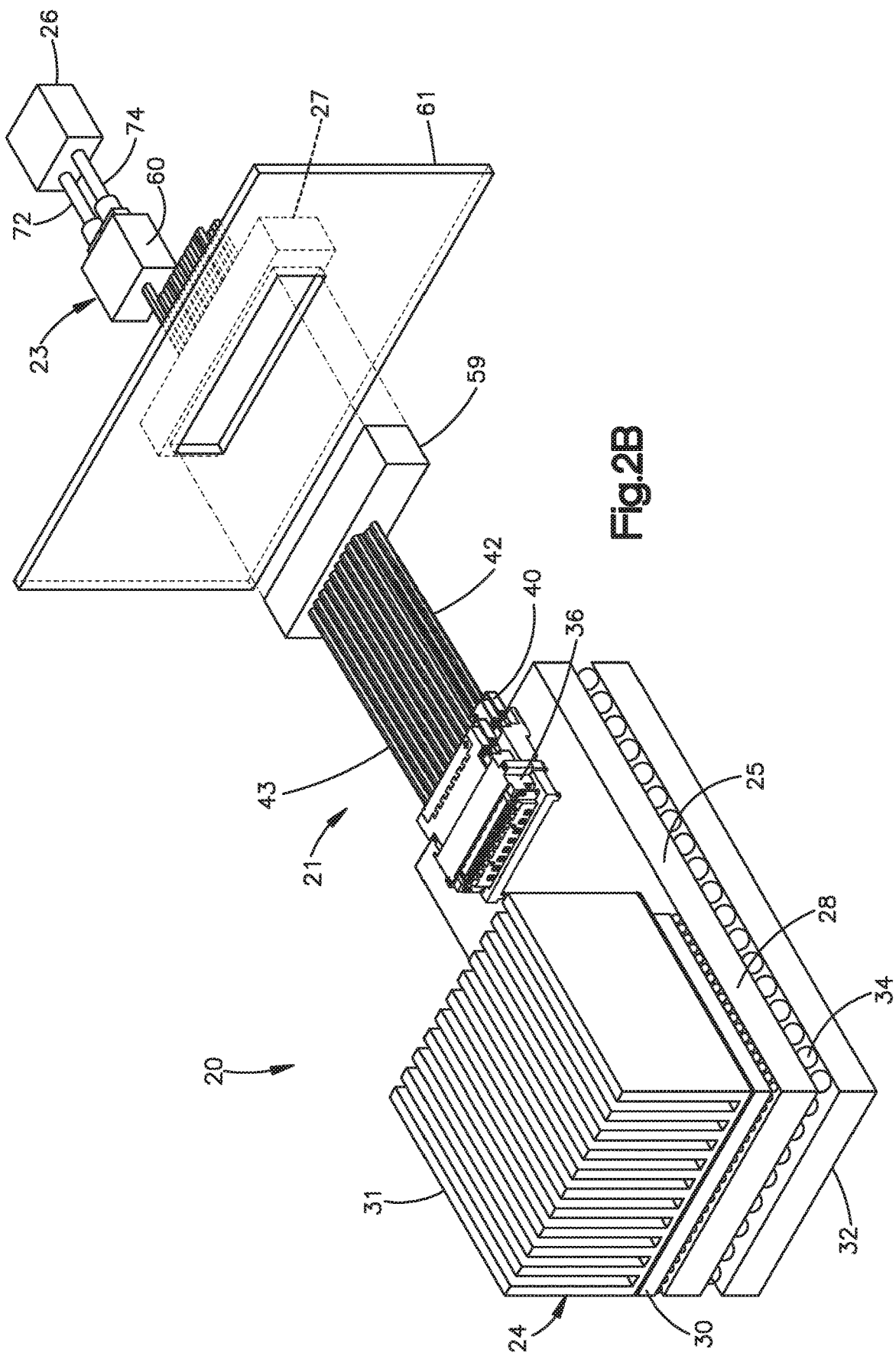
FIG. 2B is a perspective view of the die package testing system of FIG. 2A, showing the die package testing apparatus unmated from the die package assembly.

Referring now to FIG. 2B, once testing has been completed and it has been established that the determined performance metrics of the die package 25 are within acceptable ranges, the die package testing apparatus 23 can be disconnected from the die package assembly 24. In one example, the die package testing apparatus 23 is disconnected from the die package assembly 24 by unmating third electrical connector of the die package assembly 24 from the testing apparatus connector 27 of the die package testing apparatus 23. Thus, the die package testing apparatus 23 is disconnected from the twinaxial cables 43. The die package assembly 24, and in particular the third electrical connector 59, can then be placed in electrical communication with a complementary electrical component for use.

Referring again to FIGS. 2A-2B, while the die package assembly 24 and the die package testing apparatus 23 can define a separable interface between the third electrical connector 59 and the testing apparatus connector 27 in one example, the die package testing system 20 need not include the third electrical connector 59 and the testing apparatus connector 27 for the die package assembly 24 to include the second electrical connector 40 and twinaxial cables 43. In particular, and as described in more detail below, the twinaxial cables 43 and the twinaxial cable splitter 60 can define a separable interface as described in more detail below. Thus, the second ends of the twinaxial cables 43 can be placed in electrical communication with the twinaxial cable splitter 60 to mate the die package assembly 24 with the die package testing apparatus 23, and the second ends of the twinaxial cables 43 can be removed from the twinaxial cable splitter 60 to unmate the die package assembly 24 from the die package testing apparatus 23. The testing of the die package assembly 24, and particular of the IC die 30, thus includes the IC die 25, and the first and second electrical connectors 36 and 40, including the electrical cables 42. Once testing has been completed, the second ends of the twinaxial cables 43 can be terminated at any suitable complementary electrical component as desired, such as an electrical connector or substrate or PCB.

Referring now to FIG. 3, each of the twinaxial electrical cables 43 can include a first twinaxial signal conductor 46 and a second twinaxial signal conductor 48. The electrical cable 42 can further include an inner electrically insulative layer 50 that surrounds each of the first and second twinaxial signal conductors 46 and 48. Thus, the inner electrically insulative layer 50 maintains the first and second twinaxial signal conductors 46 and 48 electrically isolated from each other. The twinaxial signal conductors 46 and 48 extend through the inner electrically insulative layer 50 along the length of the electrical cable 42. In one example, the twinaxial signal conductors 46 and 48 define a differential signal pair. The electrical cable 42 can further include at least one electrically conductive shield 52 that surrounds the inner electrically insulative layer 50. For instance, the electrical cable 42 can include a first electrically conductive shield 54 that surrounds the inner electrically insulative layer 50. In accordance with certain embodiments, the at least one electrically conductive shield 52 includes only the first electrically conductive shield 54. In other examples, the at least one electrically conductive shield further includes a second electrically conductive shield 56 that surrounds the first electrically conductive shield 54.

The first electrically conductive shield 54 can include a shield body constructed of any suitable electrically conductive material as desired. In one example, the shield body of the first electrically conductive shield 54 can be configured as a serve shield having at least one wire that is wound about the electrically insulative layer 50. Alternatively, the shield body of the first electrically conductive shield 54 can be configured as any suitable electrically conductive foil. For instance, the foil can be a copper foil. Alternatively, the foil can include a polymer film with a metallic layer that is coated onto or otherwise surrounds the polymer film. The second electrically conductive shield 56 can likewise have a shield body that can be configured as any suitable electrically conductive foil. For instance, the foil can be a copper foil. Alternatively, the foil can include a polymer film with a metallic layer that is coated onto or otherwise surrounds the polymer film.

The electrical cable 42 can further include an outer electrically insulative layer 58. The outer electrically insulative layer 58 can surround the second electrically conductive shield 56. The inner electrically insulative layer 50 and the outer electrically insulative layer 58 can be constructed of any suitable dielectric material, such as plastic. The first and second twinaxial signal conductors 46 and 48 can be constructed of any suitable electrically conductive material, such as copper. The twinaxial signal conductors 46 and 48 can also include a precious metal coated onto the electrically conductive material as desired. During operation, the first and second twinaxial signal conductors 46 and 48 can be mounted to respective ones of the second electrical contacts of the electrical cable connector 40. In particular, the first and second twinaxial signal conductors 46 and 48 can extend out with respect to each of the inner electrically insulative layer 50 and the at least one electrically conductive shield 52.

The electrical cables 42 can be mounted to the second electrical connector 40 such that the electrical signal conductors 46 and 48 are mounted to the mating portions of respective different ones of the second electrical contacts 55. The electrical shield 52 can be placed in electrical communication with at least a respective one of the ground contacts of the second electrical contacts 55. For instance, the electrical shields 52 of the electrical cables 42 can be mounted to the electrically conductive shield 57 of the second electrical connector 40, thereby placing the electrical shields 52 in electrical communication with the ground contacts of the plurality of second of electrical contacts 55.

Referring again to FIGS. 1A-1D, it should be appreciated that when the electrical cables 42 are mounted to the second electrical connector 40, and the first and second electrical connectors 36 and 40 are mated to each other at a separable interface, the electrical cables 42 are placed in electrical communication with the first electrical contacts 39. Therefore, when the first electrical connector 36 is mounted to the underlying substrate, the electrical cables 42 are placed in electrical communication with the die package 25, and in particular with the IC 30. The first and second electrical connectors 36 and 40 are described in greater detail in PCT Publication No. WO 2020/076785 A1, published on Apr. 16, 2020, the disclosure of which is hereby incorporated by reference as if set forth in its entirety herein. It is recognized that the die package testing system 20 can include a plurality of first electrical connectors 36 mounted to the underlying substrate, and at least one second electrical connector 40 up to a plurality of second electrical connectors 40, mated to each of the first electrical connectors 36.

It should be appreciated that the first and second electrical connectors 36 and 40 have been described above with respect to FIGS. 1A-1D in one example, but that the cable connector system 21 can include first and second electrical connectors that are constructed in accordance with any suitable alternative manner as desired. Further, the die package assembly 24 can include either or both of the first and second electrical connectors of the cable connector system 21 as described above. In one embodiment, the die package assembly 24 includes the first electrical connector of the cable connector system 21, and the die package testing apparatus 23 includes the cable connector of the cable connector system 21. In another embodiment, the die package assembly 24 includes the first electrical connector and the cable connector of the cable connector system 21.

Figure 4A:
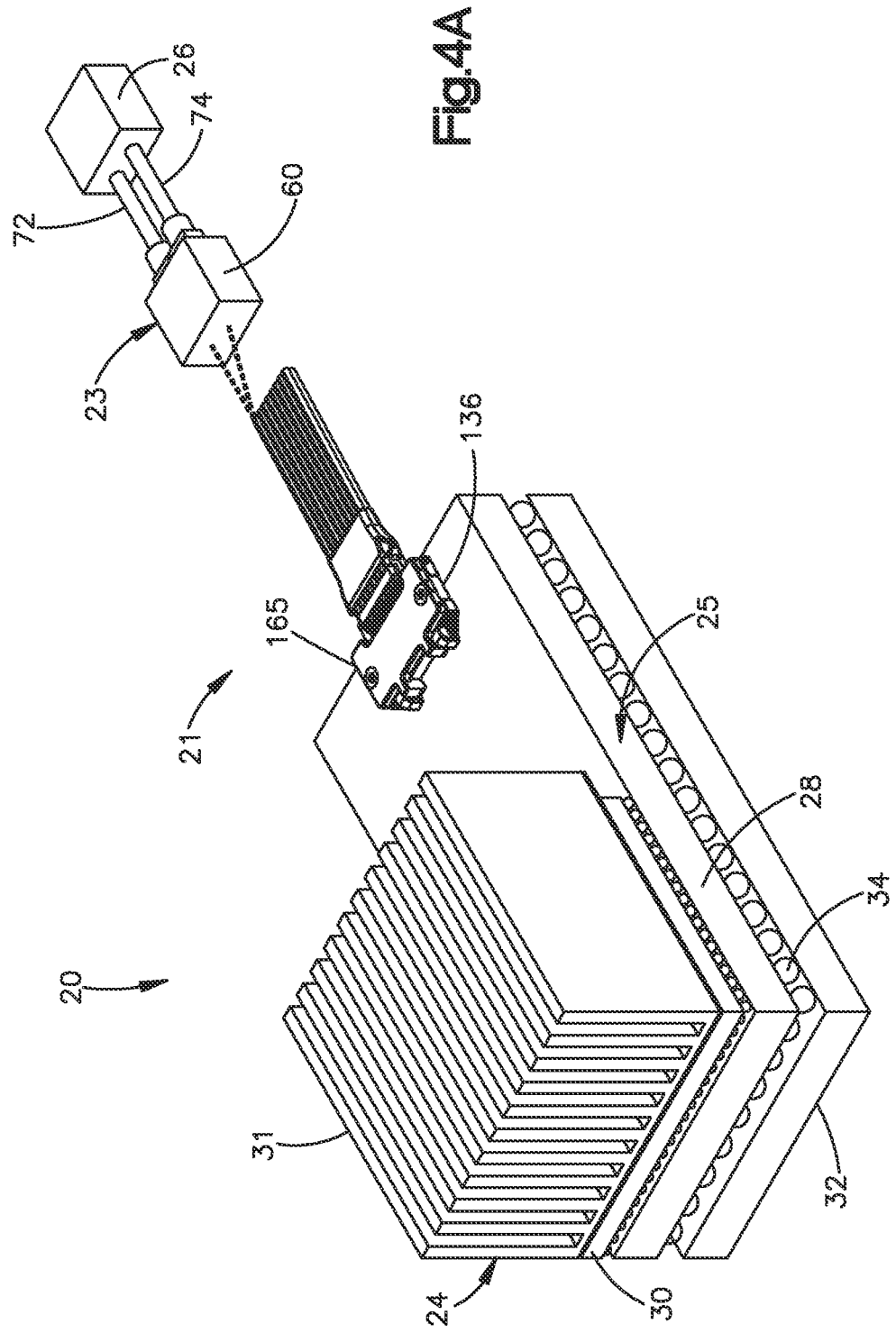
FIG. 4A is a perspective view of a die package testing system including a die package assembly and a die package testing apparatus in accordance with another alternative embodiment, wherein the die package assembly includes a die package, and a first electrical connector mounted to the die package.

For instance, referring now to FIGS. 4A-4B, it is recognized that the die package testing system 20 can include includes first and second electrical connectors 136 and 140 constructed in accordance with another embodiment that are configured to mate with each other. The first electrical connector 136 is configured to be mounted onto the package substrate 28. The second electrical connector 140 can be mounted to a plurality of electrical cables. In one example, the die package assembly 24 can include at least one electrical connector, such as at least one of the first and second electrical connectors 136 and 140. In one example, the at least one electrical connector can include at least one first electrical connector 136 mounted to the die package 25, and in particular to the package substrate 28. Thus, the first electrical connector 136 can be referred to as a PCB-mounted electrical connector (or board connector) that is mounted to the package substrate 28. Though not shown, the die package assembly 24 can include a plurality of first electrical connectors 136 mounted to the package substrate 28 and arranged about the IC 30, such as about the outer perimeter of the package substrate 28. In other examples, the die package assembly 24 can include the at least one first electrical connector 136 and at least one second electrical connector 140 that is configured to mate with the first electrical connector 136. The second electrical connector 140 can be mounted to a plurality of electrical cables 42 so as to define a cable connector. In this regard, the cable connector system 21 can include the first electrical connector 136 and the cable connector 140. In one example, the electrical cables 42 are twinaxial cables 43. When the first and second electrical connectors 136 and 140 are mated with each other while the first electrical connector 136 is mounted to the package substrate 28, the electrical cables 42 are placed in electrical communication with the IC 30 via electrical traces carried by the package substrate 28.

As described above, the die package testing apparatus 23 can include at least one die package testing device 26 that is configured to be placed in electrical communication with the at least one electrical connector of the die package assembly 24, and thus with the IC 30, so as to determine at least one various performance metric of the die package assembly 24, and in particular of the integrated circuit 30. In particular, the first and second electrical connectors 136 and 140 can be in electrical communication with both the IC 30 and the die package testing device 26. It should further be appreciated in some examples that the die package testing device 26 can communicate with the IC die over both a twinaxial cable and a pair of coaxial cables that are in electrical communication with the twin axial cable, but the die package testing device does not communicate with the IC die over a cable communication path that does not include at least one twinaxial cable. The die package testing device 26 can determine one or more metrics of the die package assembly, and in particular of the IC 30, such as the silicon performance of the IC 30, including but not limited to baud rate, output differential voltage, output alternating current (AC) common mode voltage, single-ended transmitter output voltage, effective return loss, common mode output return loss, level separation mismatch ratio, steady-state voltage, linear fit pulse peak, signal-to-noise-and-distortion ratio, uncorrelated jitter, uncorrelated jitter RMS, and even-odd jitter as described above. As the die package testing apparatus 23, and in particular the die package testing device 26, is in electrical communication with both the die package 25 and the first electrical connector 136 mounted to the die package 25, the performance of the die package assembly 24 and the first electrical connector can impact the performance metrics determined by the testing device 26.

As illustrated in FIGS. 4A-4B, the die package testing apparatus 23 can include a die package testing device 26, a testing apparatus connector 27 that is mounted to twinaxial cables 43, a twinaxial cable splitter 60 that is configured to be placed in electrical communication with at least one of the twinaxial cables 43 as described in more detail below, and route electrical signals from the twinaxial cables 43 to a respective at least one pair of coaxial cables 72 and 74 that are then routed to the testing device 26. In this regard, the die package testing device 26 is placed in electrical communication with the die package assembly 24 via the coaxial cables 72 and 74, the twinaxial cable splitter 60, and the cable connector 140 that is mated to the first electrical connector 136. In one example, the testing apparatus connector 27 can be defined by the second electrical connector 140. Accordingly, a separable interface can be defined between the first and second electrical connectors 136 and 140, which thereby establishes a separable interface between the die package assembly 24 and the die package testing apparatus 23. Accordingly, the second electrical connector 140 of the die package testing apparatus 23 can be mated with the first electrical connector 36 of the die package assembly 24 so as to place the die package testing device 26 in electrical communication with the IC 30.

Once testing of the die package 25 has been completed and the determined performance metrics were within acceptable ranges, the die package testing apparatus 23 can be disconnected from the die package assembly 24 as shown in FIG. 1B. In one example, the die package testing apparatus is disconnected from the die package assembly 24 by unmating the second electrical connector 140 of the die package testing apparatus 23 from the first electrical connector 136 of the die package assembly 24. Thus, the die package assembly 24, and in particular the first electrical connector 136, can be placed in electrical communication with a complementary electrical component for use. In other examples described below with reference to FIG. 4G, the die package assembly 24 can further include the second electrical connector 140 and the electrical cables 42 that are designed to be mated with the first electrical connector 136 during use of the die package assembly 24 after testing. Thus, the die testing apparatus 23 can be disconnected from the die package assembly 24 by disconnecting the die package testing apparatus 23 from the twinaxial cables 43.

With continuing reference to FIGS. 4A-4B, each first electrical connector 136 includes a connector assembly 163 that, in turn, includes a first connector housing 137 and a plurality of first electrical contacts 139 supported by the first connector housing 137. The first connector housing 137 can be electrically insulative. The first electrical connector 136 can further include a compression apparatus 165 that can apply a compressive force against the connector assembly 163 against the package substrate 28 that retains the first electrical contacts against the package substrate 28. Thus, the first electrical connector 136 can be said to be compression mounted to the package substrate 28. The compression apparatus 165 can be electrically insulative. As will be descried in more detail below, the compression apparatus 165 can further apply a compressive force against the second electrical connector 140 that is mated with the first electrical connector 136, so as to maintain the first and second electrical connectors 136 and 140 in a mater configuration. The first electrical contacts 139 can include electrical signal contacts and electrical ground contacts arranged in any suitable manner as desired. Immediately adjacent ones of electrical signal contacts can define differential signal pairs. Alternatively, the first electrical contacts 139 can be single ended as desired. The first electrical connector 136 is configured to be mounted to the package substrate 28, such that the first electrical contacts 139 are in electrical communication with the die package 25, and in particular with the IC 30. In particular, the first electrical contacts 139 can be mounted to respective electrical contact pads of the package substrate 28. In other examples, the first electrical connector 136 can be mounted to the host substrate 32, such that the first electrical contacts 139 are placed in electrical communication with the IC 30.

Figure 4C:
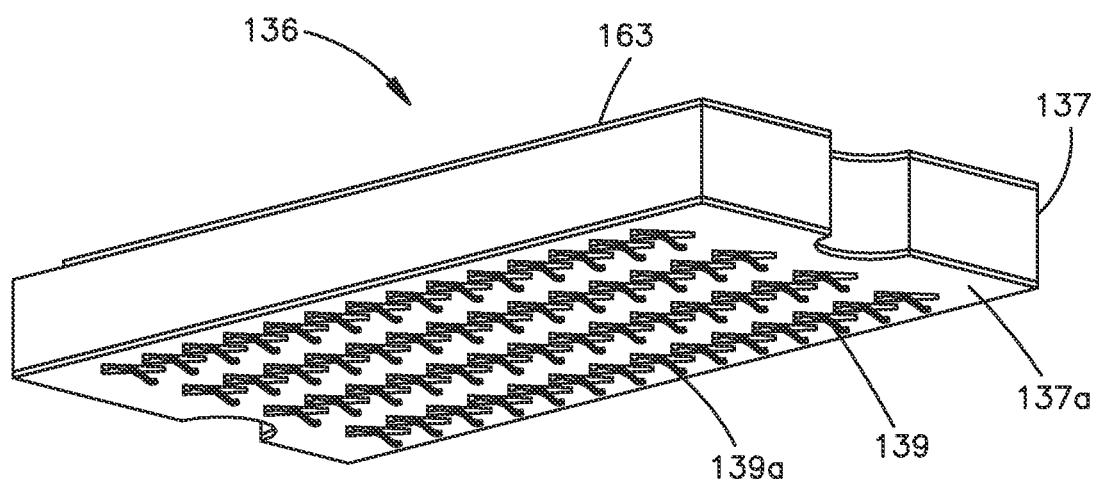
FIG. 4C is a perspective view of the first electrical connector of FIG. 4B.
Figure 4D:
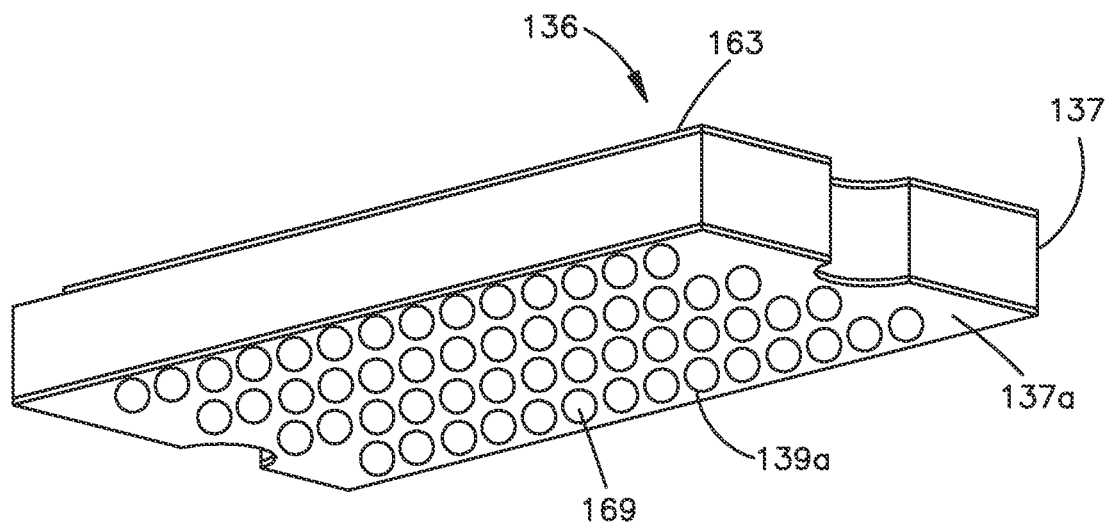
FIG. 4D is another perspective view of the first electrical connector of FIG. 4B.
Figure 4E:
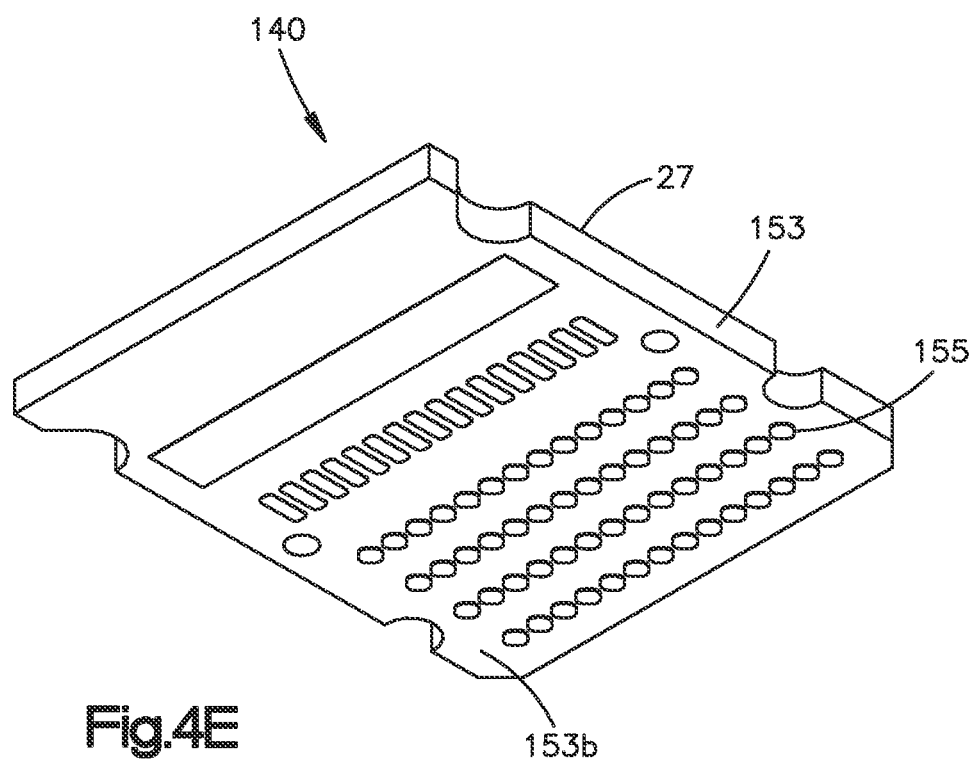
FIG. 4E is a perspective view of the second electrical connector of FIG. 4B.

Referring also to FIGS. 4C-4D, the connector housing 137 can be configured as a substrate having a first mounting side 137a and a second mating side 137b opposite the mounting side along the transverse direction T. The first electrical contacts 139 define mounting portions 139a that are carried by, for instance extend out from, the first mounting side 137a, and are configured to be mounted to the package substrate 28. For instance, the mounting portions 139a can be configured to be surface mounted to the package substrate 28. In one example shown in FIG. 4C, the mounting portions 139a can be compressible, such that they deflect and compress against the package substrate 28 so as to maintain a force against the package substrate 28 when the first electrical connector 136 is compressed against the package substrate. In this example, the mounting portions 139a define a land grid array (LGA). Alternatively, in FIG. 4D, the mounting portions 139a can include solder balls 169 that are configured to be mounted to the package substrate 28. Thus, the solder balls 169 can define a ball grid array (BGA). In particular, the solder balls 169 can be compressed against the package substrate 28 under compressive forces applied by the compression apparatus 165. The compression forces applied by the compression apparatus 28 can compress the second electrical connector 140 against the first electrical connector 136 in the manner described above. Alternatively, the solder balls 169 can be secured to the package substrate 28 during a solder reflow operation. When the solder balls 169 are secured to the package substrate 28, the compression apparatus 28 can compress the second electrical connector 140 against the first electrical connector 136.

As illustrated in FIG. 4B, the second mating side 137*b* is configured to mate with the second electrical connector 140. The first electrical contacts 139 define mating portions 139*b* that are carried by, for instance extend out from, the second mating side 137*b*, and are configured to mate with respective electrical contacts of the second electrical connector 140. In one example, the mating portions 139*b* can be compressible, such that they deflect and compress against the second electrical connector 140 so as to maintain a force against the second electrical connector 140 when the first and second electrical connectors 136 and 140 are mated with each other. The mating portions 139*b* can define a land grid array (LGA). Thus, in one example, the first electrical connector 136 can define an LGA at the mounting interface that is defined by the mounting side 137*a* and the mounting portions 139*a* of the electrical contacts, and an LGA at a mating interface that is defined by the mating side 137*b* and the mating portions 139*a* of the electrical contacts. Alternatively, the first electrical connector 136 can define a BGA at the mounting interface that is defined by the mounting side 137*a* and the mounting portions 139*a* of the electrical contacts, and an LGA at the mating interface that is defined by the mating side 137*b* and the mating portions 139*a* of the electrical contacts.

Referring now to FIGS. 4A-4E, each second electrical connector 140 can be mounted to a plurality of electrical cables 42. In this regard, the second electrical connector 140 can be referred to as a cable connector. The electrical cables 42 can be configured as twinaxial cables 43 in one example. The second electrical connector 140 can include an electrically insulative second connector housing 153 and a plurality of second electrical contacts 155 supported by the second connector housing 153. The second connector housing 153 can be configured as a substrate, or PCB paddle card populated with the second electrical contacts 155. Alternatively, the second electrical connector 140 can be configured as an extension card that is populated with the second electrical contacts 155. The second electrical contacts 155 can be configured as compression contacts, BGA contacts, or press-fit contacts as desired. The second connector housing 153 defines a first side 153*a* that is configured to mount to the electrical cables 42, and a second side 153*b* that faces the mating side 137*b* of the first connector housing 137. In this regard, first side 153*a* can be referred to as a mounting side, and the second side 153*b* can be referred to as a mating side. However, the second connector housing 153 can also be configured to mount to the electrical cables 42 at the second side 153*b*.

The second electrical contacts 155 of each of the second electrical connectors 140 can be arranged in at least one row that is oriented along the lateral direction A. For instance, the second electrical contacts can be arranged along first and second rows that extend along opposed the first and second sides 153*a* and 153*b* of the second connector housing 153. The second electrical contacts 155 can include electrical signal contacts that are configured to contact respective electrical conductors of the electrical cables 42, and an electrically conductive ground bar 157 that is disposed adjacent the respective electrical signal contacts and is configured to contact the electrical shields of the electrical cables 42 of the respective row. Immediately adjacent ones of electrical signal contacts can define differential signal pairs. Alternatively, the second electrical contacts 155 can be single ended as desired.

The second electrical contacts 155 can define mating portions that are carried by, and for instance can extend out from, the second side 153*b* of the second connector housing 153. In one example, the mating portions can be configured as surface-mount contact pads. Thus, when the second electrical connector 140 is brought against the first electrical connector 136 with the second side 153*b* of the second connector housing 153 facing the first connector housing 137, the mating portions of the second electrical contacts 155 are brought into contact with the mating portions of the first electrical contacts 139, thereby placing the electrical contacts 139 and 155 in electrical communication with each other.

The second electrical contacts 155 can define mounting portions that are carried by, and for instance can extend out from, either or both of the first side 153*a* and the second side 153*b* of the second connector housing 153. In one example, the mating portions can be configured as surface-mount contact pads. Thus, the electrical conductors of the electrical cables 42 are brought against respective ones of the mounting portions of the second electrical contacts 155 in respective rows. The electrical shields of the electrical cables 42 of each row are configured to contact a respective common ground bar. Thus, when the electrical cables 42 are mounted to the second electrical contacts, and the second electrical connector 140 is mated with the first electrical connector 136, the electrical cables 42 care placed in electrical communication with the IC die package 25, and in particular with the IC 30.

Figure 4F:
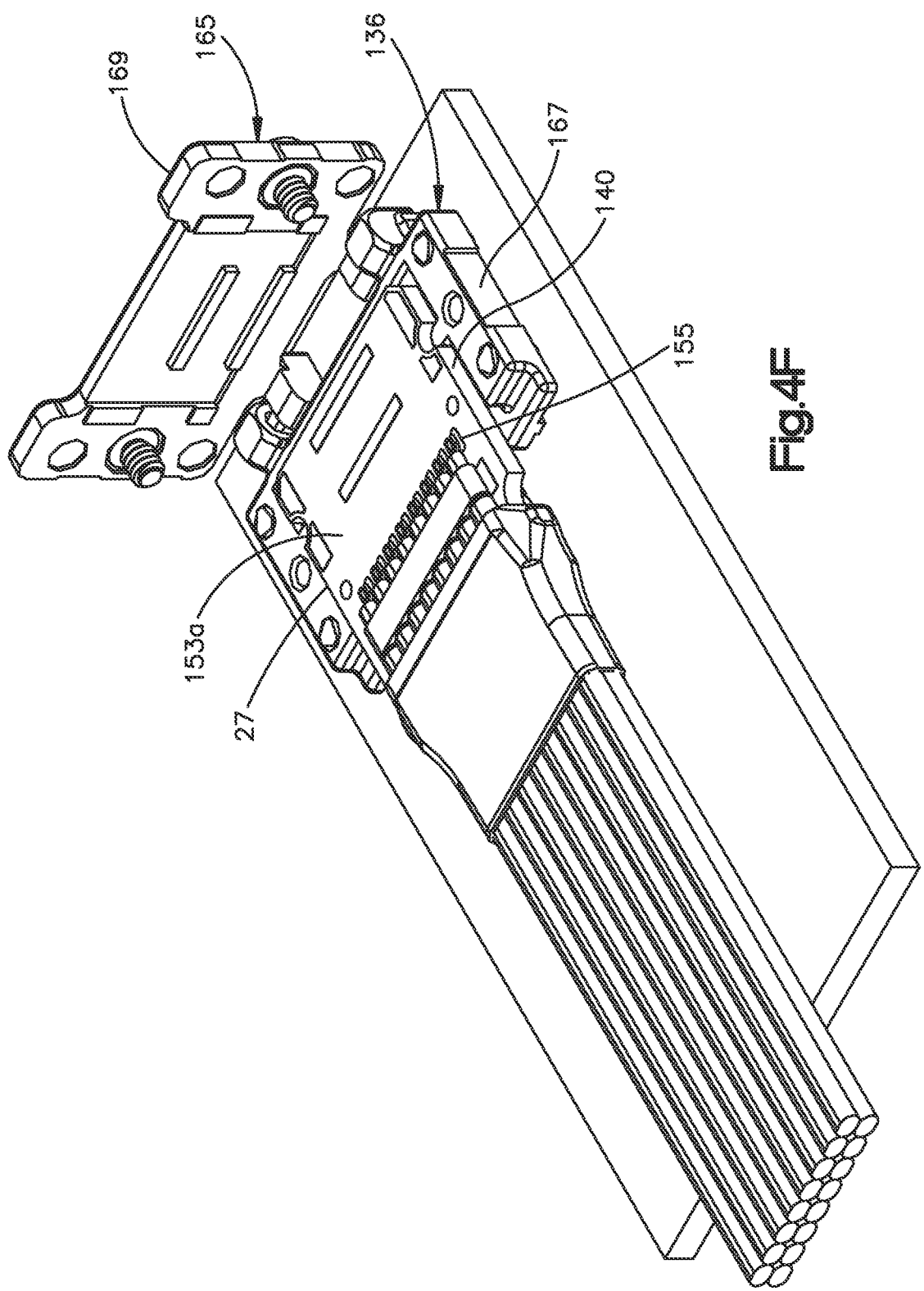
FIG. 4F is an enlarged perspective view of the first and second electrical connectors of FIG. 4B, shown configured to be secured in a mated configuration.

Referring now also to FIG. 4F, the compression apparatus 165 is configured to apply a compressive force to the second electrical connector 140 against the first electrical connector 136 to ensure that the electrical connectors 136 and 140 are securely mated to each other. In particular, the compressive force compresses the mating portions of the first electrical contacts 139 against the mating portions of the second electrical contacts 155. The compression apparatus 165 can include a securement portion 167 that mounts to the package substrate 28, and a compression member 169 that is supported by the securement member 167 and configured to move between a non-compression position to a compression position. For instance, the compression member 169 can pivot between the non-compression position to the compression position.

When in the non-compression position, the compression member 169 does not apply a compressive force to the second electrical connector 140. When in the compression position, the compression member 169 apply a compression force to the second electrical connector 140, which urges the second electrical connector 140 against the first electrical connector, thereby compressing the mating portions of the first electrical contacts 139 against the mating portions of the second electrical contacts 139. The compression force can also cause the mounting portions of the first electrical contacts 139 to bear against the package substrate 28. When the mounting portions of the first electrical contacts 155 are compressible, the compression force can cause the mounting portions to compress against the package substrate 28. The compression force thus can retain the first and second electrical connectors 136 and 140 in their mated configuration, and can further retain the first electrical connector against the package substrate 28 in its mounted configuration. The compression member 169 can also bear against the electrical cables 42, thereby also applying the compression force to the electrical cables 42 that urges the respective electrical conductors and shields against the mounting portions of the second electrical contacts 155 and ground bar 157, respectively. It should be appreciated that the compression apparatus 165 has been described in accordance with one embodiment, but that any suitable alternatively compression apparatus 165 is envisioned that is configured to apply a compression force to one or both of the first and second electrical connectors 136 and 140, alone or in combination with the electrical cables 42.

To unmate the second electrical connector 140 from the first electrical connector 136, the compression member 169 is moved of the non-compression position. The second electrical connector 140 can then be removed from the first electrical connector 136. Accordingly, in one example, the die package testing system 20 can define a separable interface between the first and second electrical connectors 136 and 140. Thus, the die package assembly 24 can include the die package 25 and the first electrical connector 136 mounted to the die package 25, and in particular to the package substrate 28. The die package testing apparatus 23 can include least one die package testing device 26, the at least one twinaxial cable splitter 60 and the coaxial cables 72 and 74 electrically connected therebetween, and the cable connector including the second electrical connector 140 and the electrical cables 42. Thus, the testing apparatus connector 27 can be defined by the second electrical connector 140. As descried above, when the testing device 26 tests the performance metrics of the IC 30, the first electrical connector 136 is included in the test. After testing has been completed, the die package assembly 24 including the first electrical connector 136 can be placed in electrical communication with a complementary electrical component for use.

Figure 4G:
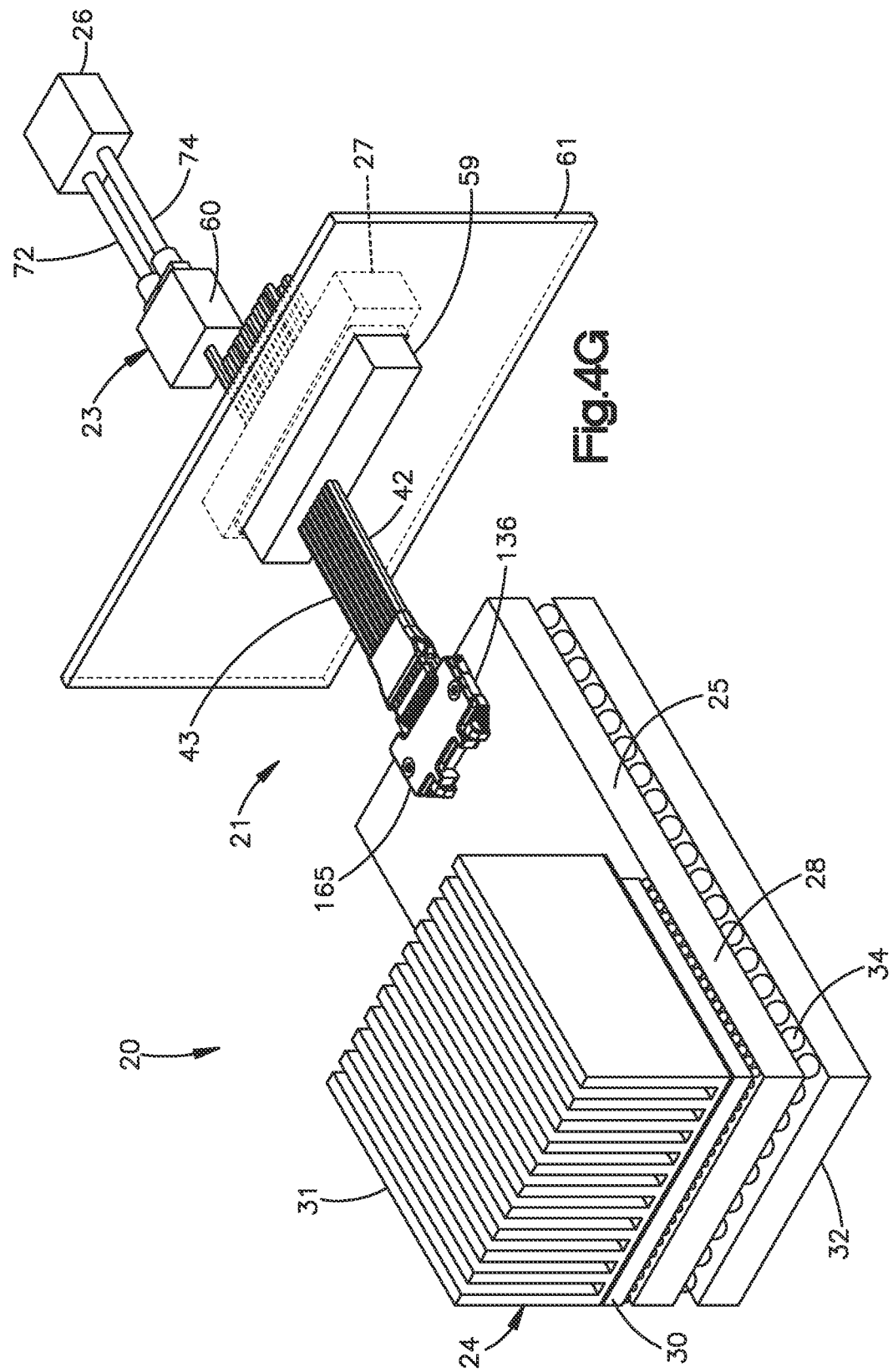
FIG. 4G is a perspective view of a die package testing system including the first and second electrical connectors of FIG. 4B, but constructed in accordance with an alternative embodiment.

Referring now to FIG. 4G, and as described above, in some examples the at least one electrical connector of the die package assembly 24 can include the first electrical connector 136 and the cable connector defined by the second electrical connector 140 and the electrical cables 42 having a first end mounted to the second electrical connector 140. The electrical cables 42 can have a second end opposite the first end that is mounted to the third electrical connector 59. Thus, the at least one electrical connector of the die package assembly 24 can also include the third electrical connector 59. The die package testing apparatus 23 can include the testing device 26, the at least one pair of coaxial cables 72 and 74, the twinaxial splitter 60, and the testing apparatus connector 27, and twinaxial cables 43 mounted to each of the testing apparatus connector 27 and the splitter 60. The testing apparatus connector 27 can be configured to mate with the third electrical connector 59, thereby placing the testing device 26 in electrical communication with the die package assembly 24 as described above. In this regard, the die package testing device 26 is placed in electrical communication with the die package assembly 24 via the coaxial cables 72 and 74, the twinaxial cable splitter 60, and the testing apparatus connector 27. Because the testing apparatus connector 27 is mounted to the twinaxial cables 43 that, in turn, are mounted to the splitter 60, the testing apparatus connector 27 can be referred to as a cable connector.

A separable interface can be defined between the third electrical connector 59 and the testing apparatus connector 27, which thereby establishes a separable interface between the die package assembly 24 and the die package testing apparatus 23. Accordingly, the testing apparatus connector 27 of the die package testing apparatus 23 can be mated with the third electrical connector 59 of the die package assembly 24 so as to place the die package testing device 26 in electrical communication with the IC 30. In one example, the testing apparatus connector 27 can be mounted to a first side of a panel 61, and the third electrical connector 59 can be inserted through an opening of the panel 61 from a second side of the panel opposite the first side, and mated with the testing apparatus connector 27.

As the die package testing apparatus 23, and in particular the die package testing device 26 is in electrical communication with the die package 25 via the first and second electrical connectors 36 and 40 and the third electrical connector 59, the testing of the die package assembly 24 includes the electrical connectors 36, 40, and 59, which can impact the performance metrics determined by the testing device 26.

Once testing has been completed and it has been established that the determined performance metrics of the die package 25 are within acceptable ranges, the die package testing apparatus 23 can be disconnected from the die package assembly 24. In one example, the die package testing apparatus 23 is disconnected from the die package assembly 24 by unmating third electrical connector of the die package assembly 24 from the testing apparatus connector 27 of the die package testing apparatus 23. Thus, the die package testing apparatus 23 is disconnected from the twinaxial cables 43. The die package assembly 24, and in particular the third electrical connector 59, can then be placed in electrical communication with a complementary electrical component for use.

While the die package assembly 24 and the die package testing apparatus 23 can define a separable interface between the third electrical connector 59 and the testing apparatus connector 27 as shown in FIG. 4G, the die package testing system 20 need not include the third electrical connector 59 and the testing apparatus connector 27 for the die package assembly 24 to include the second electrical connector 40 and twinaxial cables 43. In particular, and as described in more detail below, the twinaxial cables 43 and the twinaxial cable splitter 60 can define a separable interface as described in more detail below. Thus, the second ends of the twinaxial cables 43 can be placed in electrical communication with the twinaxial cable splitter 60 to mate the die package assembly 24 with the die package testing apparatus 23, and the second ends of the twinaxial cables 43 can be removed from the twinaxial cable splitter 60 to unmate the die package assembly 24 from the die package testing apparatus 23. The testing of the die package assembly 24, and particular of the IC die 25, thus includes the IC die 25, and the first and second electrical connectors 136 and 140, including the electrical cables 42. Once testing has been completed, the second ends of the twinaxial cables 43 can be terminated at any suitable complementary electrical component as desired, such as an electrical connector or substrate or PCB.

Referring now to FIGS. 5A-5B, it is recognized that the die package testing system 20 can include includes first and second electrical connectors 236 and 240 constructed in accordance with yet another embodiment that are configured to mate with each other. The first electrical connector 236 is configured to be mounted onto the package substrate 28. The second electrical connector 240 can be mounted to a plurality of electrical cables 42. In one example, the die package assembly 24 can include at least one electrical connector, such as at least one of the first and second electrical connectors 236 and 240. In one example, the at least one electrical connector can include at least one first electrical connector 236 mounted to the die package 25, and in particular to the package substrate 28. Thus, the first electrical connector 236 can be referred to as a PCB-mounted electrical connector (or board connector) that is mounted to the package substrate 28. Though not shown, the die package assembly 24 can include a plurality of first electrical connectors 236 mounted to the package substrate 28 and arranged about the IC 30, such as about the outer perimeter of the package substrate 28. In other examples, the die package assembly 24 can include the at least one first electrical connector 236 and at least one second electrical connector 240 that is configured to mate with the first electrical connector 236. The second electrical connector 240 can be mounted to a plurality of electrical cables 42 so as to define a cable connector. In this regard, the cable connector system 21 can include the first electrical connector 236 and the cable connector 240. In one example, the electrical cables 42 are twinaxial cables 43. When the first and second electrical connectors 236 and 240 are mated with each other while the first electrical connector 236 is mounted to the package substrate 28, the electrical cables 42 are placed in electrical communication with the IC 30 via electrical traces carried by the package substrate 28.

As described above, the die package testing apparatus 23 can include at least one die package testing device 26 that is configured to be placed in electrical communication with the at least one electrical connector of the die package assembly 24, and thus with the IC 30, so as to determine at least one performance metric of the die package assembly 24, and in particular of the integrated circuit 30. In particular, the first and second electrical connectors 236 and 240 can be in electrical communication with both the IC 30 and the die package testing device 26. It should further be appreciated in some examples that the die package testing device 26 can communicate with the IC die over both a twinaxial cable and a pair of coaxial cables that are in electrical communication with the twin axial cable, but the die package testing device does not communicate with the IC die over a cable communication path that does not include at least one twinaxial cable. The die package testing device 26 can determine one or more metrics of the die package assembly, and in particular of the IC 30, such as the silicon performance of the IC 30, including but not limited to baud rate, output differential voltage, output alternating current (AC) common mode voltage, single-ended transmitter output voltage, effective return loss, common mode output return loss, level separation mismatch ratio, steady-state voltage, linear fit pulse peak, signal-to-noise-and-distortion ratio, uncorrelated jitter, uncorrelated jitter RMS, and even-odd jitter as described above. As the die package testing apparatus 23, and in particular the die package testing device 26, is in electrical communication with both the die package 25 and the first electrical connector 136 mounted to the die package 25, the testing of the die package assembly 24, and in particular of the die package 25, includes first electrical connector 236, which can impact the performance metrics determined by the testing device 26.

As illustrated in FIGS. 4A-4B, the die package testing apparatus 23 can include a die package testing device 26, a testing apparatus connector 27 that is mounted to twinaxial cables 43, a twinaxial cable splitter 60 that is configured to be placed in electrical communication with at least one of the twinaxial cables 43 as described in more detail below, and route electrical signals from the twinaxial cables 43 to a respective at least one pair of coaxial cables 72 and 74 that are then routed to the testing device 26. In this regard, the die package testing device 26 is placed in electrical communication with the die package assembly 24 via the coaxial cables 72 and 74, the twinaxial cable splitter 60, and the cable connector 240 that is mated to the first electrical connector 236. In one example, the testing apparatus connector 27 can be defined by the second electrical connector 240. Accordingly, a separable interface can be defined between the first and second electrical connectors 236 and 240, which thereby establishes a separable interface between the die package assembly 24 and the die package testing apparatus 23. Accordingly, the second electrical connector 140 of the die package testing apparatus 23 can be mated with the first electrical connector 36 of the die package assembly 24 so as to place the die package testing device 26 in electrical communication with the IC 30.

Once testing of the die package 25 has been completed and the determined performance metrics were within acceptable ranges, the die package testing apparatus 23 can be disconnected from the die package assembly 24 as shown in FIG. 1B. In one example, the die package testing apparatus is disconnected from the die package assembly 24 by unmating the second electrical connector 140 of the die package testing apparatus 23 from the first electrical connector 136 of the die package assembly 24. Thus, the die package assembly 24, and in particular the first electrical connector 236, can be placed in electrical communication with a complementary electrical component for use.

With continuing reference to FIGS. 5A-5B, each first electrical connector 236 can include a substrate 241 that is configured as an extension card. The extension card can, in turn, define an edge card 243 that carries electrical traces 245. Each second electrical connector 240 can define a receptacle 247 that is configured to receive the edge card 243, for instance along the longitudinal direction L so as to mate the first and second electrical connectors 236 and 240 to each other, thereby placing the first and second electrical connectors 236 and 240 in electrical communication with each other as described above. Each second electrical connector 240 can be mounted to a plurality of electrical cables 42. In this regard, the second electrical connector 240 can be referred to as a cable connector. The electrical cables 42 can be configured as twinaxial cables 43 in one example. The twinaxial cables 43 are placed in electrical communication with the IC die package 25, and in particular with the IC 30, when the first electrical connector 236 is mounted to the package substrate 28 and the second electrical connector 240 is mated with the first electrical connector 236. To unmate the second electrical connector 240 from the first electrical connector 236, the substrate of the first electrical connector 236 is removed from the second electrical connector 240, for instance along the longitudinal direction L.

Accordingly, in one example, the die package testing system 20 can define a separable interface between the first and second electrical connectors 236 and 240. Thus, the die package assembly 24 can include the die package 25 and the first electrical connector 236 mounted to the die package 25, and in particular to the package substrate 28. The die package testing apparatus 23 can include least one die package testing device 26, the at least one twinaxial cable splitter 60 and the coaxial cables 72 and 74 electrically connected therebetween, and the cable connector including the second electrical connector 140 and the electrical cables 42. Thus, the testing apparatus connector 27 can be defined by the second electrical connector 240. As descried above, when the testing device 26 tests the performance metrics of the IC 30, the first electrical connector 236 is included in the test. After testing has been completed, the die package assembly 24 including the first electrical connector 236 can be placed in electrical communication with a complementary electrical component for use.

In other examples described above, the electrical cables 42 can extend from the second electrical connector 240 to a third electrical connector that, in turn, mates with a testing apparatus connector that, in turn, is mounted to twinaxial cables that are electrically coupled to the twinaxial cable splitter 60. Thus, the third electrical connector and the testing apparatus connector can define a separable interface, and the die package assembly 24 can include the third electrical connector. Alternatively still, the twinaxial cables 43 and the twinaxial cable splitter 60 can define a separable interface as described in more detail below. Thus, the second ends of the twinaxial cables 43 can be placed in electrical communication with the twinaxial cable splitter 60 to mate the die package assembly 24 with the die package testing apparatus 23, and the second ends of the twinaxial cables 43 can be removed from the twinaxial cable splitter 60 to unmate the die package assembly 24 from the die package testing apparatus 23. Once testing has been completed, the second ends of the twinaxial cables 43 can be terminated at any suitable complementary electrical component as desired, such as an electrical connector or substrate or PCB.

As described above, the first and second electrical connectors of the cable connector system 21 can be configured as desired, such that the first electrical connector is mounted to the package substrate 28 and the second electrical connector mates to the electrical cables 42 and is configured to mate with the first electrical connector. It should be appreciated, in other examples, that the first electrical connector in accordance with all embodiments described herein and alternatively embodiments can be mounted to the host substrate 32, and placed in electrical communication with the IC die 30 through the package substrate 28.

For instance, the first electrical connector can be a board-mounted electrical connector that is mounted to the die package substrate as described above, but wherein the board-mounted connector is configured to mate with an extension card, such that the electrical cable connector is electrically connected to the IC die through the extension card, as described in PCT Publication WO 2020/051183 published on Mar. 12, 2020. The disclosure of PCT Publication WO 2020/051183 is hereby incorporated by reference as if set forth in its entirety herein. In one example, the electrical cable connector mates with a complementary electrical connector that, in turn, is mounted onto the extension card. In another example, the electrical cable connector can be compression-mounted to the extension card One example of an alternative compression-mount cable connector system is described in PCT Publication No. WO 2018/045026 A1, published on Mar. 8, 2018, the disclosure of which is hereby incorporated by reference as if set forth in its entirety herein. Alternatively, the electrical cables 42 can be directly mounted to the underlying substrate as described in PCT Publication No. WO 2019/099450 A1 published on May 23, 2019, such that the electrical cables 42 are in electrical communication with the die package 25, and in particular with the IC 30, without defining a separable interface between the electrical cables 42 and the die package 25. PCT Publication No. WO 2019/099450 A1 is hereby incorporated by reference as if set forth in its entirety herein. Alternatively still, the die package substrate can define a card edge, and the electrical cable connector can receive the card edge so as to place the electrical cables 42 in electrical communication with the IC die. Alternatively still, the electrical cables can be compression-mated in an electrical connector that, in turn, is directly mounted to the die package substrate 28 as described in US 2019/0267732 which published on Aug. 29, 2019 and is hereby incorporated by reference as if set forth in its entirety herein. Alternatively still, the first and second electrical connectors can be configured as described in U.S. Pat. No. 10,833,437, issued on Nov. 10, 2020, the disclosure of which is hereby incorporated by reference as if set forth in its entirety herein. It is understood that these various electrical connectors and systems for placing the electrical cables 42 in electrical communication with the die package 25, and in particular with the IC 30, are presented by way of example only, and that other electrical connectors and systems are envisioned.

Figure 6A:
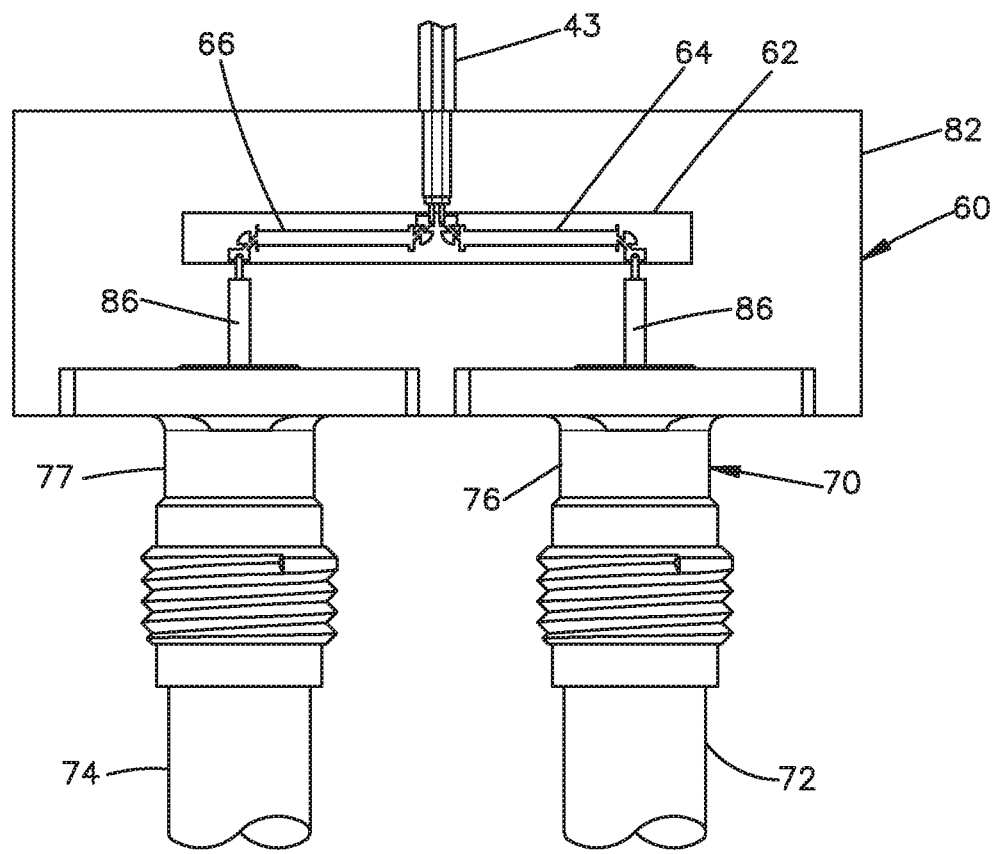
FIG. 6A is a schematic elevation view of a twinaxial cable shown in electrical communication with the twinaxial splitter of FIG. 3, and in further electrical communication with a pair of coaxial cables.

Referring now also to FIG. 6A, and as described above, the testing system 20 includes the twinaxial cable splitter 60 that is configured to be placed in electrical communication with at least one of the twinaxial cables 43, and route electrical signals from the at least one of the twinaxial cables 43 to respective coaxial cables that are then routed to the testing device 26, thereby placing the testing device 26 in electrical communication with at the least one of the twinaxial cables 43.

Thus, electrical signals carried by the first electrical conductor 46 of the twinaxial cable 43 (see FIG. 3) are routed to a first coaxial cable 72, and electrical signals carried by the second electrical conductor 48 are routed to a second coaxial cable 74. The twinaxial cable 43 can be permanently mounted to both the twinaxial cable splitter 60 and to the second electrical connector 40. Thus, a cable assembly can include the second electrical connector 40, which can define a cable connector of the cable assembly, a twinaxial cable splitter 60, and at least one twinaxial cable 43 that is mounted to each of the cable connector of the cable assembly and the twinaxial cable splitter 60. Alternatively, the twinaxial cable 43 can be mated to the twinaxial cable splitter 60 at a separable interface. Alternatively or additionally, the twinaxial cable 43 can be mated to the second electrical connector 40 at a separable interface. Alternatively as described above, the twinaxial cable can be mounted directly to the underlying substrate.

Figure 6B:
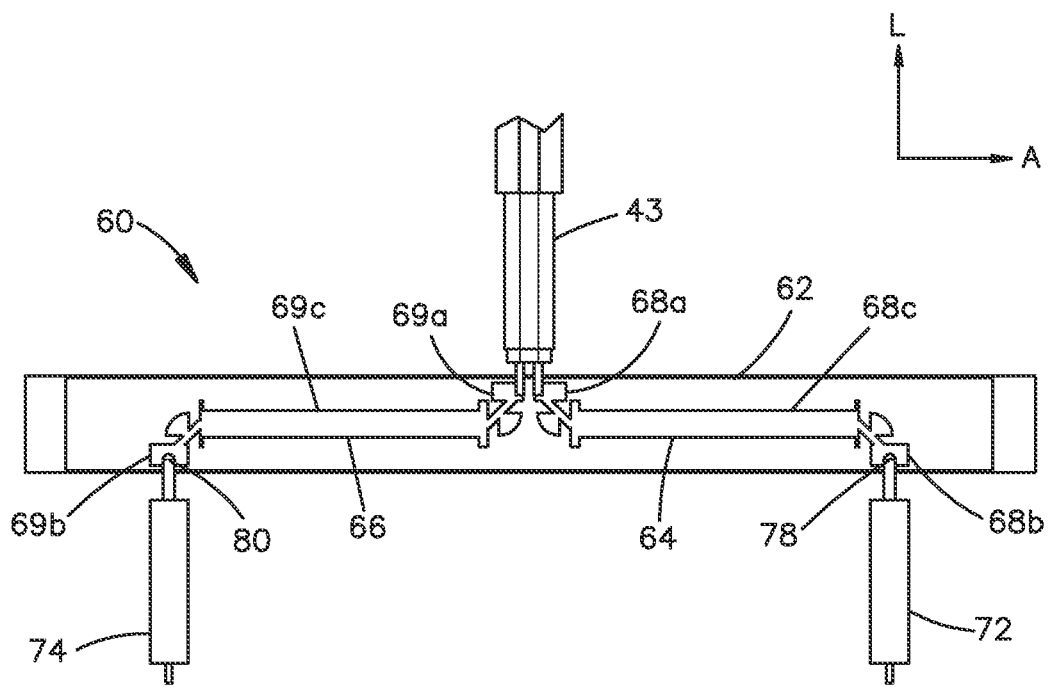
FIG. 6B is a schematic top plan view of the splitter of FIG. 6A.
Figure 6C:
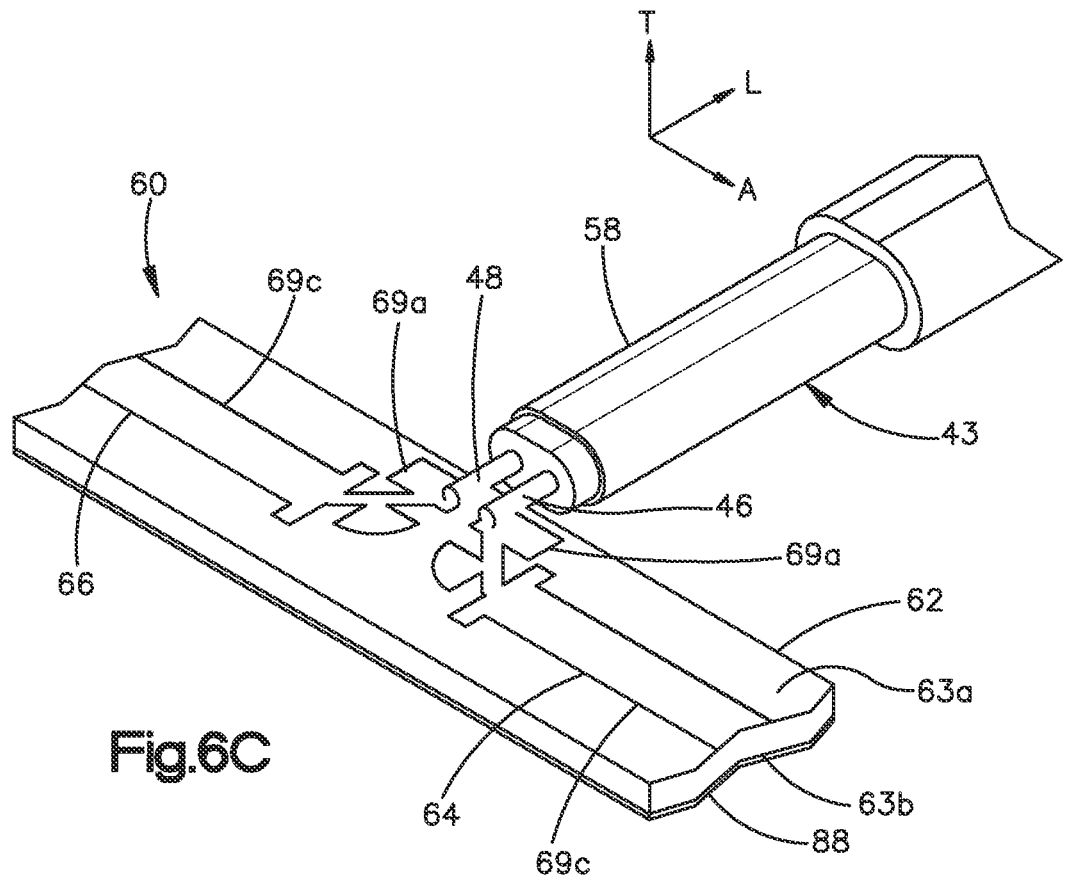
FIG. 6C is a perspective view of a twinaxial cable mounted to the splitter illustrated in FIG. 6B, in accordance with one example.

Referring now to FIGS. 6A-6C, the testing system 40 can further include the twinaxial splitter 60 that is configured to mate with the twinaxial cable 43 at one end, and route electrical signals from the first and second twinaxial signal conductors 46 and 48 to at least one complementary electrical component. The at least one complementary electrical component can be configured as the first and second coaxial cables 72 and 74. It is appreciated, however, that any suitable alternative component configured to communicate the data signals from the twinaxial cables 43 to the testing device 26 is envisioned.

The twinaxial splitter 60 can include a splitter substrate 62, and first and second electrical splitter conductors 64 and 66, respectively, supported by the splitter substrate 62. For instance, at least a portion up to an entirety of each of the first and second electrical splitter conductors 64 and 66 can be supported by a first outer surface 63a of the splitter substrate 62. The first outer surface 63a can be defined by an upper surface of the splitter substrate 62. The splitter substrate 62 can be electrically nonconductive. For instance, the splitter substrate 62 can be FR4 material. Alternatively, the splitter substrate 62 can be a polyimide. Alternatively still, the splitter substrate 62 can be a silica or glass. In this regard, it is appreciated that the splitter substrate 62 can be any alternative suitable electrically insulative material as desired. In one example, the electrical splitter conductors 64 and 66 can be configured as electrical traces that extend on and/or in the splitter substrate 62 so as to define a printed circuit board such as a paddle card. It should be appreciated, of course, that the splitter substrate 62 can be configured as any suitable alternative substrate that carries alternatively configured electrical conductors that define the electrical splitter conductors 64 and 66. The splitter substrate 62 can be planar along a lateral direction A and a longitudinal direction L that is perpendicular to the lateral direction A.

The first and second electrical splitter conductors 64 and 66 can be spaced from each other along the lateral direction A and electrically isolated from each other. The first and second electrical splitter conductors 64 and 66 are configured to be placed in electrical communication with the first and second twinaxial signal conductors 46 and 48, respectively. In particular, the first electrical splitter conductor 64 defines a respective first portion 68a that is configured to be placed in electrical contact with the first electrical signal conductor 46 of the twinaxial cable 43 and a respective second portion 68b that is in electrical communication with a first complementary electrical signal conductor of the at least one complementary electrical component 70. The second electrical splitter conductor 66 defines a respective first portion 69a that is configured to be placed in electrical contact with the second electrical signal conductor 48 of the twinaxial cable 43 and a respective second portion 69b that is in electrical communication with a second complementary electrical signal conductor of the at least one complementary electrical component 70. In one example, the first and second electrical signal conductors 46 and 48 of the twinaxial cable 43 can be placed against the electrical splitter conductors 64 and 66 so as to define respective separable interfaces. In some examples, the first and second electrical signal conductors 46 and 48 of the twinaxial cable 43 can be removably secured against the first and second electrical splitter conductors 64 and 66, respectively. In other examples, the first and second electrical signal conductors 46 and 48 of the twinaxial cable 43 can be permanently attached to the respective first and second electrical splitter conductors 64 and 66. For instance, the first and second electrical signal conductors 46 and 48 of the twinaxial cable 43 can be soldered to the electrical splitter conductors 64 and 66.

In one example, the first portions 68a and 69a can define respective first ends of the first and second electrical splitter conductors 64 and 66, respectively. The second portions 68b and 69b can define respective second ends of the first and second electrical splitter conductors 64 and 66, respectively. Thus, the first portions 68a and 69a can be disposed opposite the second ends 68b and 69b. The first electrical splitter conductor 64 can further define an intermediate portion 68c disposed between the first portion 68a and the second portion 68b. Similarly, the second electrical splitter conductor 66 can further define an intermediate portion 69c disposed between the first portion 69a and the second portion 69b. The intermediate portions 68c and 69c can flare away from each other in a direction of travel from the first portions 68a and 69a to the second portions 68b and 69b. Thus, the first portions 68a and 69a can be spaced from each other a first distance along the lateral direction A. The second portions 68b and 69b can be spaced from each other a second distance greater than the first distance. In one example, the intermediate portions 68c and 69c can extend along the lateral direction A away from each other. Alternatively, the intermediate portions 68c and 69c can extend along both the lateral direction A and the longitudinal direction A.

In one example, the at least one complementary electrical component 70 can be configured as a first coaxial cable 72 and a second coaxial cable 74. The first coaxial cable 72 can be mounted to the first electrical splitter conductor 64. Accordingly, when the first electrical signal conductor 46 of the twinaxial cable 43 is placed in contact with the first electrical splitter conductor 64, the first electrical signal conductor 46 and the first coaxial cable 72 are placed in electrical communication with each other. Similarly, the second coaxial cable 74 can be mounted to the second electrical splitter conductor 66. Accordingly, when the second electrical signal conductor 48 of the twinaxial cable 43 is placed in contact with the second electrical splitter conductor 66, the first electrical signal conductor 48 and the second coaxial cable 74 are placed in electrical communication with each other. The splitter 60 can include at least one RF interconnect, such as at least one RF jack that can include a pair of RF jacks. The RF jacks can be configured as a first outer coaxial ferrule 76 and a second outer coaxial ferrule 77. The ferrules 76 and 77 can be externally threaded so as to facilitate attachment to the first and second coaxial cables 72 and 74, respectively. The first coaxial cable 72 can include a first coaxial signal conductor 78 that extends through the first outer ferrule 76 (see FIG. 7C) and the second coaxial cable 74 can include a second coaxial signal conductor 80 (see FIG. 7C) that extends through the second outer ferrule 77. It will thus be appreciated that the differential signals on the twinaxial cable 43 can be routed in the splitter 60 to the respective pair of RF jacks. Accordingly, the twinaxial cable 43 are placed in electrical communication with at least one RF jack, such as the pair of RJ jacks as well as the coaxial cables 72 and 74 that are coupled to the RF jacks. Otherwise stated, the RF jacks can be in electrical communication with the respective electrical conductors of the twinaxial cable.

Figure 7A:
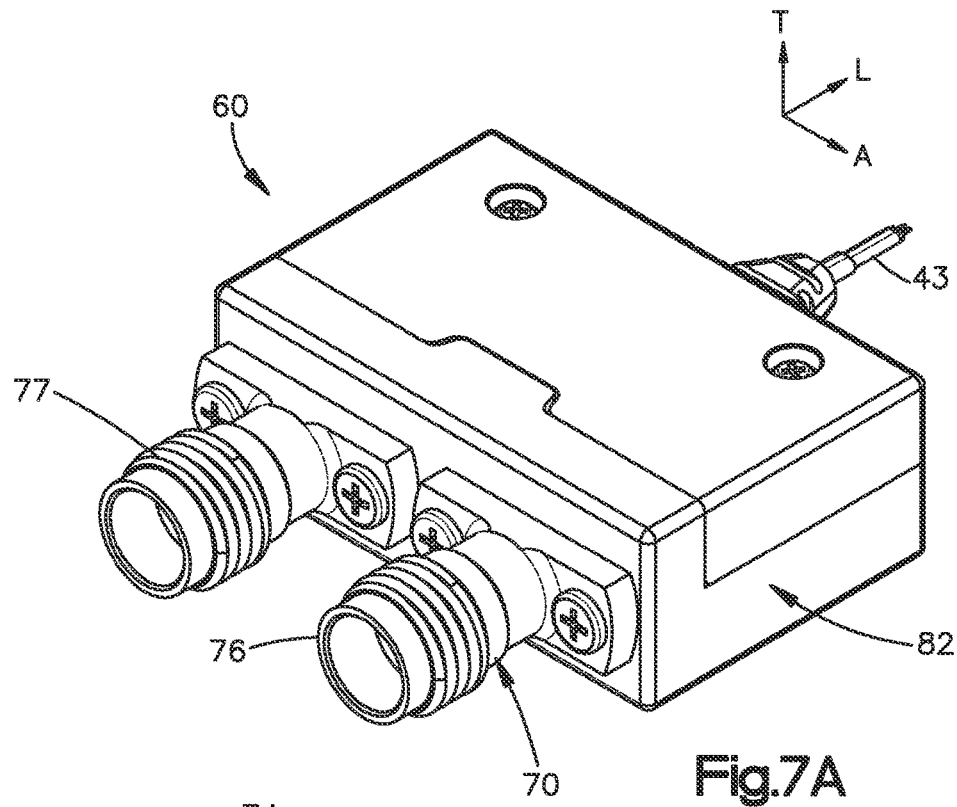
FIG. 7A is a perspective view of a twinaxial cable splitter constructed in accordance with another example.
Figure 7B:
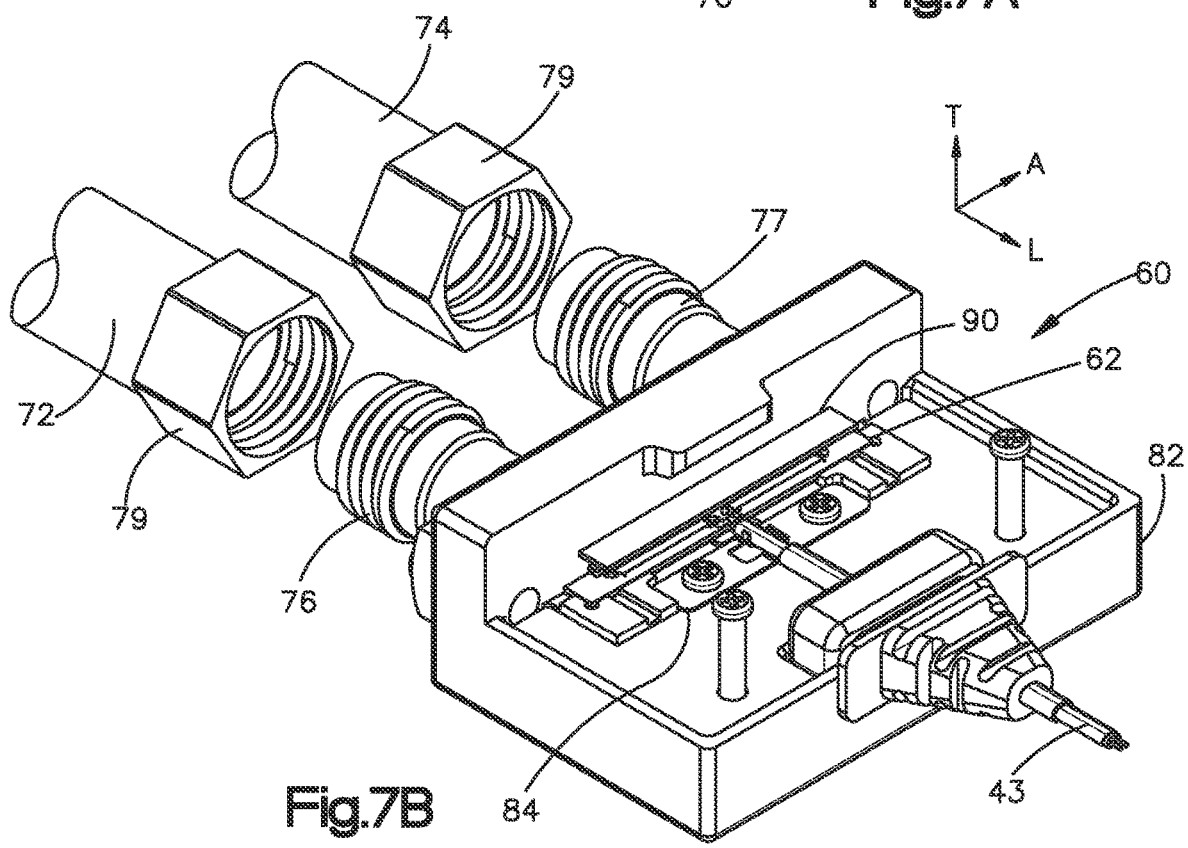
FIG. 7B is another perspective view of the twinaxial cable splitter illustrated in FIG. 7A, shown with a portion of a splitter housing removed.
Figure 7C:
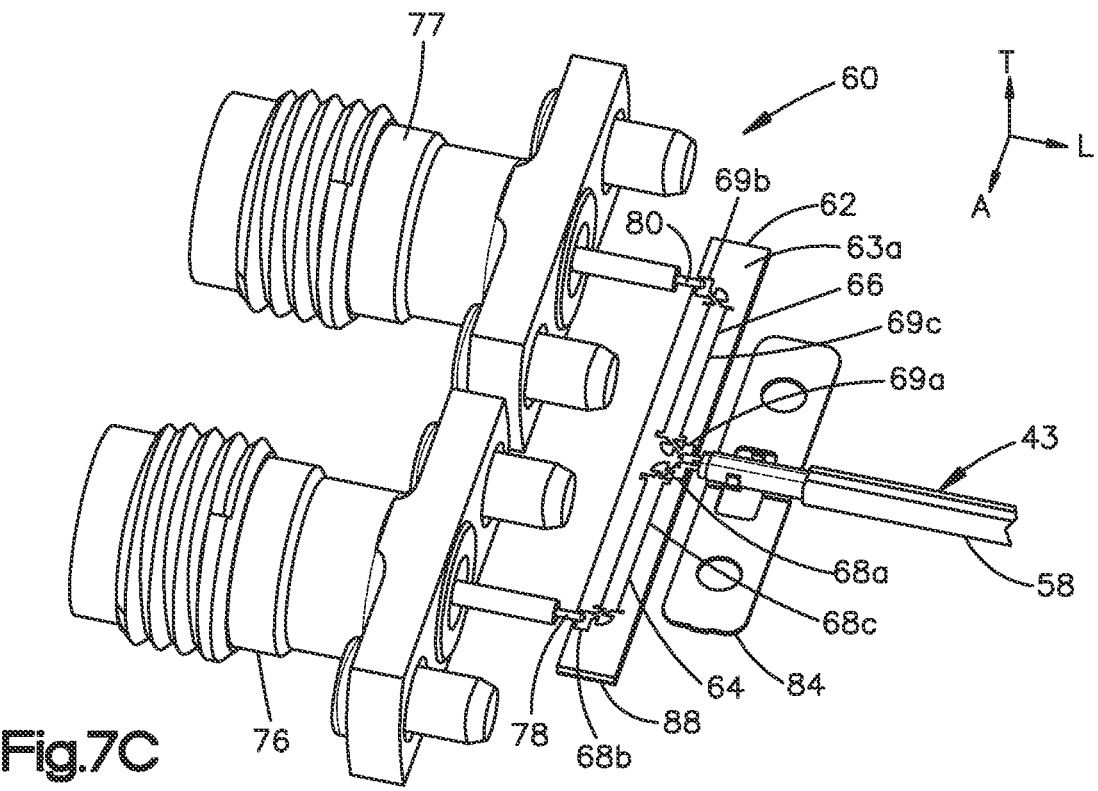
FIG. 7C is a top perspective view of a portion of the twinaxial cable splitter illustrated in FIG. 7A, shown with the splitter housing removed.
Figure 7D:
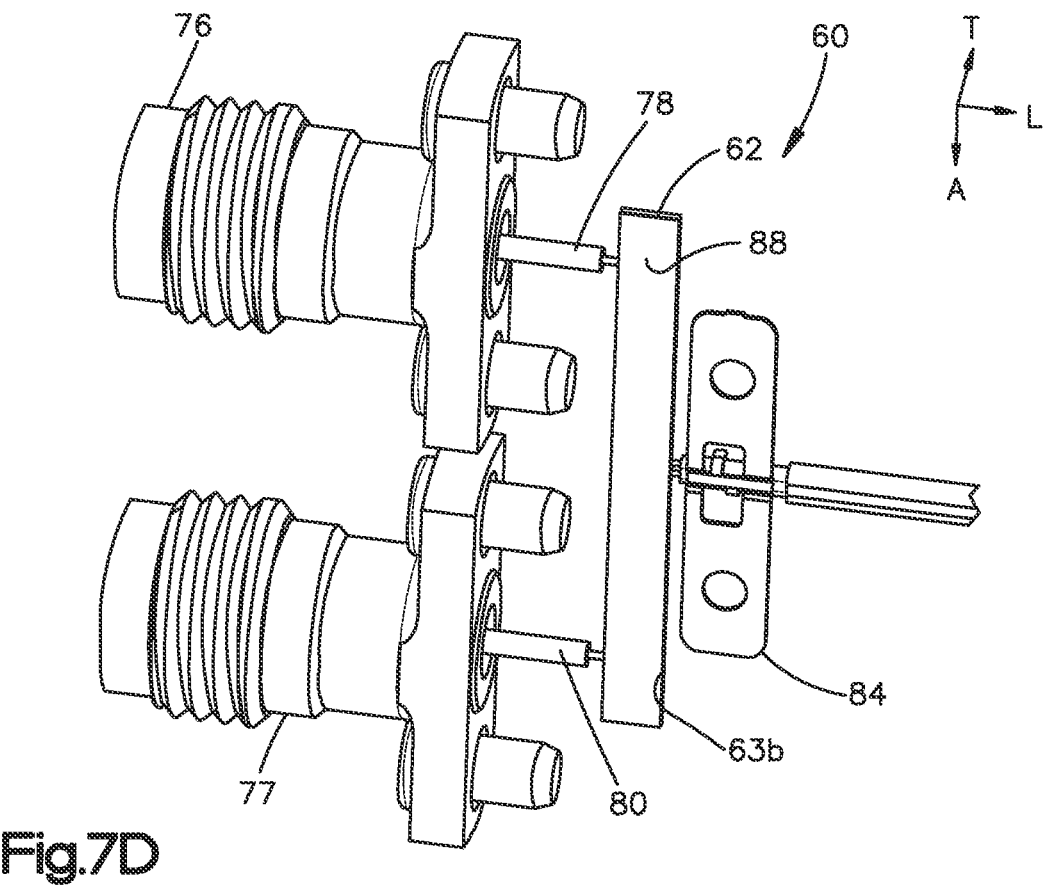
FIG. 7D is a bottom perspective view of the portion of the twinaxial cable splitter illustrated in FIG. 7A.

As illustrated in FIG. 7C, the first coaxial signal conductor 78 can be mounted to the first electrical splitter conductor 64. In particular, the first coaxial signal conductor 78 can be mounted to the second portion 68b of the first electrical splitter conductor 64. Similarly, the second coaxial signal conductor 80 can be mounted to the second electrical splitter conductor 66. In particular, the second coaxial signal conductor 80 can be mounted to the second portion 69b of the second electrical splitter conductor 66. When the first and second coaxial signal conductors 78 and 80 are mounted to the respective first and second electrical splitter conductors 64 and 66, the first and second coaxial signal conductors 78 and 80 are placed in electrical communication with the first and second twinaxial signal conductors 46 and 48, respectively.

Referring now to FIGS. 7A-7D, the twinaxial splitter 60 can further include a splitter housing 82 that supports the splitter substrate 62. The splitter housing 82 can further support the twinaxial cable 43 at a first end of the splitter housing 82 such that the respective first and second twinaxial signal conductors 46 and 48 are placed against the first and second electrical splitter conductors 64 and 66, respectively. The splitter housing 82 can further support the complementary electrical component 70 at a second end of the splitter housing 82 that is opposite the first end of the splitter housing.

The twinaxial splitter 60 can further include a first electrical ground member 84 that is supported by the splitter housing 82 at a location electrically isolated from the electrical splitter conductors 64 and 66. In one example, the first ground member 84 can be free standing at a location spaced from the splitter substrate 62 along the longitudinal direction L. For instance, the splitter substrate 62 can be spaced in a forward direction from the first ground member 84. Alternatively, the first ground member 84 can be supported by the splitter substrate 62. The first electrical ground member 84 can be made of any suitable electrically conductive material. The electrically conductive material can be a metal such as copper, silver, gold, or any suitable alternative electrically conductive material as desired. In one example, the first electrical ground member 84 can be configured as a first ground plate having opposed surfaces that are substantially planar along the lateral direction A and the longitudinal direction L. The at least one electrically conductive shield 52 of the twinaxial cable 43 can be in electrical communication with the first electrical ground member 84 when the first and second twinaxial signal conductors 46 and 48 are in electrical communication with the 64 and 66, respectively. For instance, the at least one electrically conductive shield 52 of the twinaxial cable 43 can be in contact with the electrical ground member 84. For instance, if the at least one electrically conductive shield 52 includes only the first electrically conductive shield 54, the electrically conductive shield 54 can contact the electrical ground member 84. If the at least one electrically conductive shield further includes the second electrically conductive shield 56, the second electrically conductive shield 56 can contact the electrical ground member 84.

The first electrical ground member 84 is further in electrical communication with at least one complementary ground member of the at least one complementary electrical component 70. The splitter housing 82 can be in electrical communication with each of the at least one ground member of the at least one complementary electrical component 70 and the first electrical ground member 84. When the at least one complementary electrical component 70 is configured as the first and second coaxial cables 72 and 74, the at least one complementary ground member can be defined by a first electrical shield 86 of the first coaxial cable 72 and a second electrical shield 86 of the second coaxial cable 72. The first electrical shield 86 of the first coaxial cable 72 can be placed in electrical communication with the first outer ferrule 76 that surrounds the first coaxial signal conductor 78. The second electrical shield 86 of the second coaxial cable 72 can be placed in electrical communication with the second outer ferrule 77 that surrounds the second coaxial signal conductor 80. In one example, at least a portion of the splitter housing 82 up to an entirety of the splitter housing 82 can be electrically conductive. Alternatively, the splitter 60 can include one or more electrically conductive member that place the at least one complementary ground member in electrical communication with the first electrical ground member.

The twinaxial splitter 60 can further include a second electrical ground member 88 that is electrical communication with each of the first electrical ground member 84 and the at least one complementary ground member of the at least one complementary electrical component 70. For instance, the second electrical ground member 88 can be in contact with the splitter housing 82. Thus, the splitter hosing 82 can be in electrical communication with the at least one complementary ground member, the first electrical ground member 84, and the second electrical ground member 88. The second electrical ground member 88 can be made from an electrically conductive material. For instance, the second electrical ground member 88 can be metallic. In some example, the second electrical ground member 88 can be copper, silver, gold, or any suitable alternative electrically conductive material as desired. Alternatively, the second electrical ground member 88 can be made of an electrically conductive or nonconductive lossy material. In one example, the second electrical ground member 88 can be supported by a second outer surface 63b of the splitter substrate 62 that is opposite the first outer surface 63a along a transverse direction T. The transverse direction T is perpendicular to each of the longitudinal direction L and the lateral direction A. The second outer surface 63b can be defined by a lower surface of the splitter substrate 62. In one example, the second electrical ground member 88 can be configured as a plate that extends along the second outer surface 63b of the splitter substrate 62. For instance, the second electrical ground member 88 can extend along an entirety of the second outer surface 63b of the splitter substrate 62. The second electrical ground member 88 can be aligned with the first and second electrical splitter conductors 64 and 66 along the transverse direction, and thus can provide electrical shielding to the first and second electrical splitter conductors 64 and 66. The splitter substrate 62 can electrically isolate the electrical splitter conductors 64 and 66 from the second electrical ground member 88. In examples whereby the splitter housing 82 is electrically nonconductive, the splitter 60 can include an electrical conductor that places the second electrical ground member 88 in electrical communication with each of the first electrical ground member 84 and the at least one complementary ground member.

The twinaxial splitter 60 can further include an electrical shield 90 that is in alignment with the first and second electrical splitter conductors 64 and 66 along the transverse direction T. In one example, the electrical shield 90 can be spaced from the splitter substrate 62 along the transverse direction T, and can face the first outer surface 63a of the splitter substrate 62. Accordingly, the first and second electrical splitter conductors 64 and 66 can be disposed between the second electrical ground member 88 and the electrical shield 90. To the extent that the second electrical ground member 88 is referred to as a first electrical shield, the electrical shield 90 can be referred to as a second electrical shield. In one example, the electrical shield 90 can be an electrically absorptive shield made from any suitable electrically absorptive material. For instance, the electromagnetic absorptive material can be a lossy material. Alternatively, the electrical shield 90 can be electrically conductive. Further, the electrical shield 90 can be grounded or ungrounded.

While the twinaxial splitter 60 has been described in connection with the testing system 20 as described above, it is recognized that the twinaxial splitter 60 can have other uses. For instance, the twinaxial splitter 60 can place the twinaxial cable in electrical communication with any suitable complementary electrical component 70, such as coaxial cables or alternatively constructed complementary electrical component that is configured to transmit electrical signals to the testing device 26. It has been found that a data communication system including the twinaxial cable 43, the twinaxial splitter 60, and the complementary electrical component 70 can suitably transmit electrical signals from the twinaxial cables to the testing device 26 to test the IC 30 of the IC die package 25 to which the twinaxial cables are placed in electrical communication.

Figure 8A:
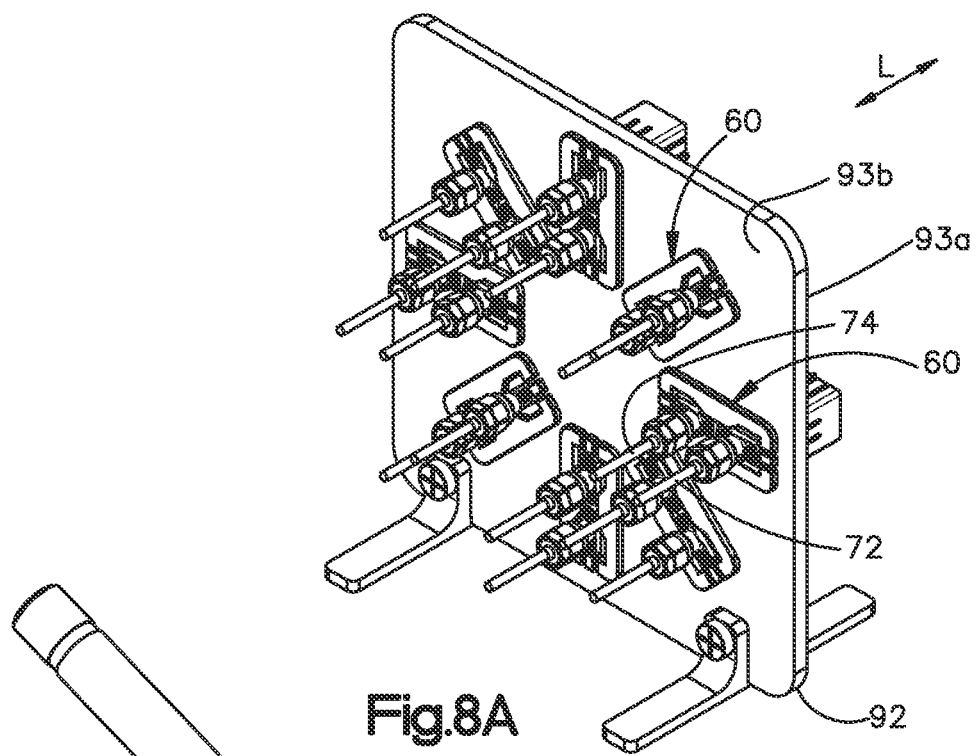
FIG. 8A is a perspective view of a panel that supports a plurality of the twinaxial cable splitters.
Figure 8B:
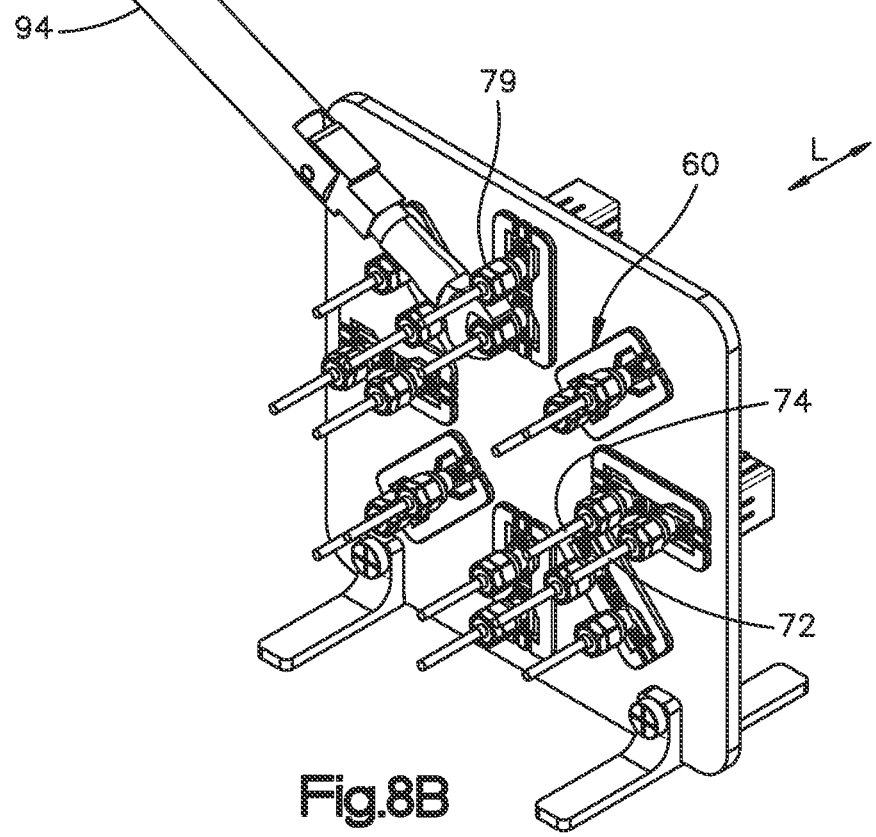
FIG. 8B is a perspective view of the panel illustrated in FIG. 5A, showing the twinaxial splitters positioned on the panel so as to receive a wrench configured to secure coaxial cables to the twinaxial splitters.

Referring now to FIG. 8A, in some examples, at least one twinaxial cable splitter 60 can be mounted on a panel 92 having a first side 93a and a second side 93b opposite the first side 93a along the longitudinal direction L. Thus the data communication system can include the panel 92. The twinaxial splitters 60 can be mounted on the panel 92 such that the twinaxial cable 43 enters the twinaxial cable splitter 60 from the first side 93a of the panel, and the at least one complementary electrical component 70 exits the twinaxial cable splitter 60 at the second side 93b. The twinaxial cable splitter 60 can extend through a hole that extends through the panel 92 along the longitudinal direction L from the first side 93*a* to the second side 93*b*. In one example, a plurality of twinaxial cable splitters 60 can be mounted to the panel 92 through respective holes that extend through the panel from the first side 93*a* to the second side 93*b*. Any number of twinaxial cable splitters 60 can be mounted to the panel 92 as desired. For instance, eight twinaxial cable splitters 60 can be mounted to the panel 92 in one example. The twinaxial cable splitters 60 can be arranged about the panel 61 in a group of splitters 60 along a path that defines an enclosed regular geometric perimeter. The regular geometric perimeter can have an equal number of sides as the number of splitters 60 in the group. Thus, in one example, the eight twinaxial cable splitters 60 can extend along an octagonal path. Each of the twinaxial cable splitters 60 of the group defines a respective lateral axis that extends substantially through respective central axes of the respective first and second coaxial signal conductors 78 and 80. The lateral axes of the twinaxial cable splitters 60 of the group of each of the twinaxial cable splitters 60 can intersect each other. As illustrated in FIG. 8B, the arrangement of the group of twinaxial cable splitters 60 can provide sufficient clearance so as to allow a torque wrench 94 to access the ferrules 76 and 78 of the coaxial cables 72 and 74, respectively and apply torque onto a threaded nut 79 that threadedly fastens the coaxial cables to the ferrules 76 and 78, and thus also to the splitter 60.

Figure 9:
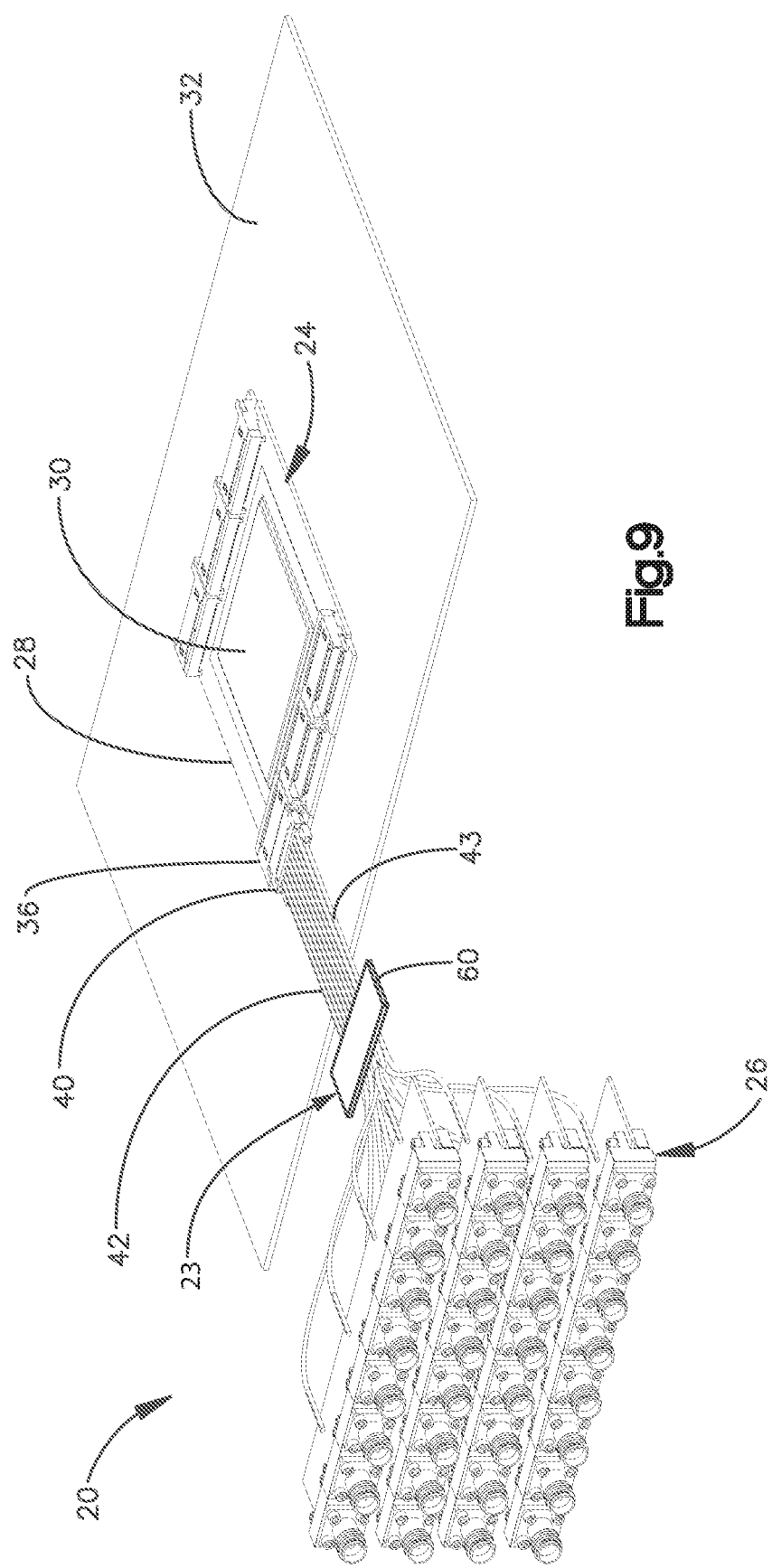
FIG. 9 is another perspective view of the testing apparatus of FIG. 1A, but showing a twinaxial splitter electrically coupled to a plurality of twinaxial cables.

Referring again to FIGS. 7A-7D, the splitter housing 60 can support a single twinaxial cable 43 as described above. Alternatively, as illustrated in FIG. 9, the twinaxial cable splitter 60 can be coupled to a plurality of twinaxial cables 43 and a plurality of corresponding pairs of coaxial cables. For instance, the twinaxial cable splitter 60 can include a plurality of pairs of first and second electrical splitter conductors 64 and 66. The pairs of splitter conductors 64 and 66 can be supported by a common splitter substrate 62, or can be supported by respective different splitter substrates 62. The twinaxial splitter 60 can include the one or more ground members of the twinaxial cable splitter 60 and one or more shields of the twinaxial cable splitter 60 described above to correspond to each pair of electrical splitter conductors 64 and 66. Alternatively, the one or more ground members of the twinaxial cable splitter 60 and one or more shields of the twinaxial cable splitter 60 described above can be enlarged so as to provide grounding and/or electrical shielding to each pair of electrical splitter conductors 64 and 66. The coaxial cables that are in electrical communication with respective signal conductors of a corresponding plurality of twinaxial cables can extend from the splitter 60 to a single testing device 26, or to a respective plurality of testing devices 26.

In one aspect of the present disclosure, a method for testing at least one performance metric of an IC die of the die package 25 includes a step of routing electrical signals from the first and second electrical signal conductors 46 and 48 of the twinaxial cable 43 to the first and second electrical splitter conductors 64 and 66 supported by the splitter substrate 62, and placing the testing device 26 in electrical communication with the first and second electrical splitter conductors 64 and 66. In some examples, the method can further include the step of attaching the first and second electrical signal conductors 46 and 48 of the twinaxial cable 43 to the twinaxial cable splitter 60. In other examples, the first and second electrical conductors 46 and 48 are permanently mounted to the twinaxial cable splitter 60. The method can further include the step of routing the electrical signals from the first and second electrical splitter conductors 64 and 66 to the first and second coaxial signal conductors 78 and 80, respectively, and further routing the electrical signals from the first and second coaxial signal conductors 78 and 80 to the testing device 26. In some examples, the method can include the step of placing the testing device 26 in electrical communication with the first and second electrical signal conductors 78 and 80. In other examples, the coaxial cables are permanently mounted to the testing device 26.

Testing of the IC die and/or the die package can be performed solely through an electrical connector mounted directly to the die package substrate or mounting pads on the die package substrate. Thus, the electrical connector can be in electrical communication with the IC die only through electrical traces supported by the die package substrate. The electrical connector is in electrical communication with at least one twinaxial cable. The electrical connector can be something other than a die cast block or RF jack. For instance, the electrical connector can include an electrically insulative connector housing and a plurality of electrical signal contacts, such as two or more, supported by the connector housing and mounted to respective contact pads of the die package substrate in the manner described above. Adjacent ones of the signal contacts can define differential signal pairs as described above.

It should be noted that the illustrations and discussions of the embodiments shown in the figures are for exemplary purposes only and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated. Various orientational terms as applied to an apparatus, such as top, bottom, upper, and lower, such be understood as relative to a typical orientation of the apparatus as it would rest on a horizontal surface.

What is claimed:
1. A method comprising the steps of:
placing an IC package testing device in electrical communication with a first electrical connector mounted to a package substrate of a die package assembly that includes the package substate and an IC die mounted on the package substrate;
mating an electrical cable connector to the first electrical connector so as to define a separable interface, such that the IC package testing device is in electrical communication with a twinaxial cable that is mounted to the electrical cable connector; and
using the IC package testing device to determine at least one performance metric of the die package assembly.

2. The method of claim 1, wherein twinaxial cables extend from the cable connector to a twinaxial cable splitter that routes electrical signals from the twinaxial cable to first and second coaxial cables that are electrically coupled to the IC package testing device.

3. The method of claim 1, wherein the twinaxial cables terminate at a third electrical connector, and the method further comprises mating a testing apparatus electrical connector with the third electrical connector so as to place the IC package testing device in electrical communication with the first electrical connector.

4. The method of claim 3, wherein twinaxial cables extend from the testing apparatus electrical connector to a twinaxial cable splitter that routes electrical signals from the twinaxial cable to first and second coaxial cables that are electrically coupled to the IC package testing device.

5. The method of claim 1, wherein the using step comprises using the IC package testing device to determine at least one performance metric of the IC die.

6. The method of claim 1, wherein the IC package testing device does not communicate with the IC die over a cable communication path that does not include a twinaxial cable.

7. The method of claim 6, wherein the die package testing device is in communication with the IC die over both the twinaxial cable and a pair of coaxial cables that are in electrical communication with the twinaxial cable.

8. The method of claim 7, comprising routing electrical signals from the twinaxial cable to the pair of coaxial cables through a twinaxial cable splitter.

9. The method of claim 8, wherein the twinaxial cable splitter comprises:
   a housing; and
   an electrically nonconductive substrate supported by the housing, and first and second electrical splitter conductors supported by the electrically nonconductive substrate and electrically isolated from each other,
   wherein the first electrical splitter conductor defines a respective first portion that is configured to be placed in electrical contact with a first electrical signal conductor of a twinaxial cable and a respective second portion that is in electrical communication with a first complementary electrical signal conductor of at least one complementary electrical component, and the second electrical splitter conductor defines a respective first portion that is configured to be placed in electrical contact with a second electrical signal conductor of the twinaxial cable and a respective second portion that is in electrical communication with a second complementary electrical signal conductor of the at least one complementary electrical component.

10. The method of claim 9, wherein the at least one complementary electrical component is a first electrical connector, the method comprising the steps of mating electrical cable connector with the first electrical connector, wherein the electrical cable connector is mounted to twinaxial cables that are in electrical communication with the IC package testing device, and the twinaxial cables include the twinaxial cable.

\* \* \* \* \*